US010823630B1

(12) United States Patent
Dong et al.

(10) Patent No.: US 10,823,630 B1
(45) Date of Patent: Nov. 3, 2020

(54) HIGH SENSITIVITY MEMS PRESSURE SENSOR

(71) Applicant: Iowa State University Research Foundation, Inc., Ames, IA (US)

(72) Inventors: Liang Dong, Ames, IA (US); Qiugu Wang, Ames, IA (US); Wei Hong, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 144 days.

(21) Appl. No.: 15/811,154

(22) Filed: Nov. 13, 2017

Related U.S. Application Data

(60) Provisional application No. 62/420,905, filed on Nov. 11, 2016.

(51) Int. Cl.
*G01L 9/00* (2006.01)
(52) U.S. Cl.
CPC .......... *G01L 9/0054* (2013.01); *G01L 9/0047* (2013.01)
(58) Field of Classification Search
CPC ..................... G01L 9/0054; G01L 9/0047
See application file for complete search history.

(56) References Cited

U.S. PATENT DOCUMENTS

| 5,437,736 A | 8/1995 | Cole |
| 7,235,736 B1 | 6/2007 | Buller et al. |
| 9,625,330 B2 * | 4/2017 | Park ........................ G01L 1/205 |

(Continued)

OTHER PUBLICATIONS

Smith, et al., "Electromechanical Piezoresistive Sensing in Suspended Graphene Membranes", Nano Letters, vol. 13, pp. 3237-3242, 2013.

(Continued)

*Primary Examiner* — Herbert K Roberts
*Assistant Examiner* — John M Royston
(74) *Attorney, Agent, or Firm* — McKee, Voorhees & Sease, PLC

(57) ABSTRACT

We present a microelectromechanical system (MEMS) graphene-based pressure sensor realized by transferring a large area, few-layered graphene on a suspended silicon nitride thin membrane perforated by a periodic array of micro-through-holes. Each through-hole is covered by a circular drum-like graphene layer, namely a graphene "microdrum". The uniqueness of the sensor design is the fact that introducing the through-hole arrays into the supporting nitride membrane allows generating an increased strain in the graphene membrane over the through-hole array by local deformations of the holes under an applied differential pressure. Further reasons contributing to the increased strain in the devised sensitive membrane include larger deflection of the membrane than that of its imperforated counterpart membrane, and direct bulging of the graphene microdrum under an applied pressure. Electromechanical measurements show a gauge factor of 4.4 for the graphene membrane and a sensitivity of 2.8×10-5 mbar-1 for the pressure sensor specific example described, with a good linearity over a wide pressure range. The present sensor outperforms most existing MEMS-based small footprint pressure sensors using graphene, silicon, and carbon nanotubes as sensitive materials, due to the high sensitivity.

15 Claims, 21 Drawing Sheets

(56) References Cited

U.S. PATENT DOCUMENTS

Figure 1A:
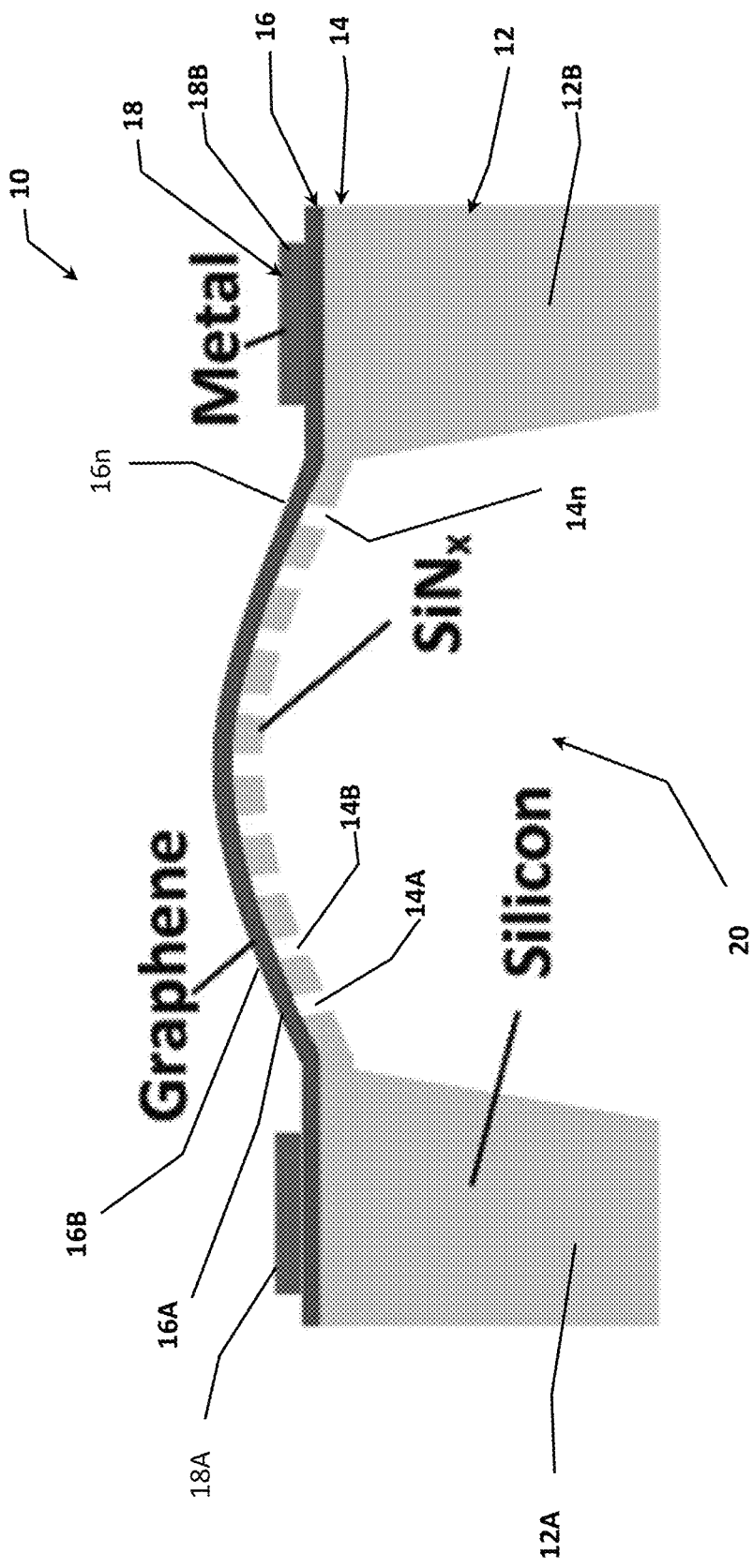
Figure 1B:
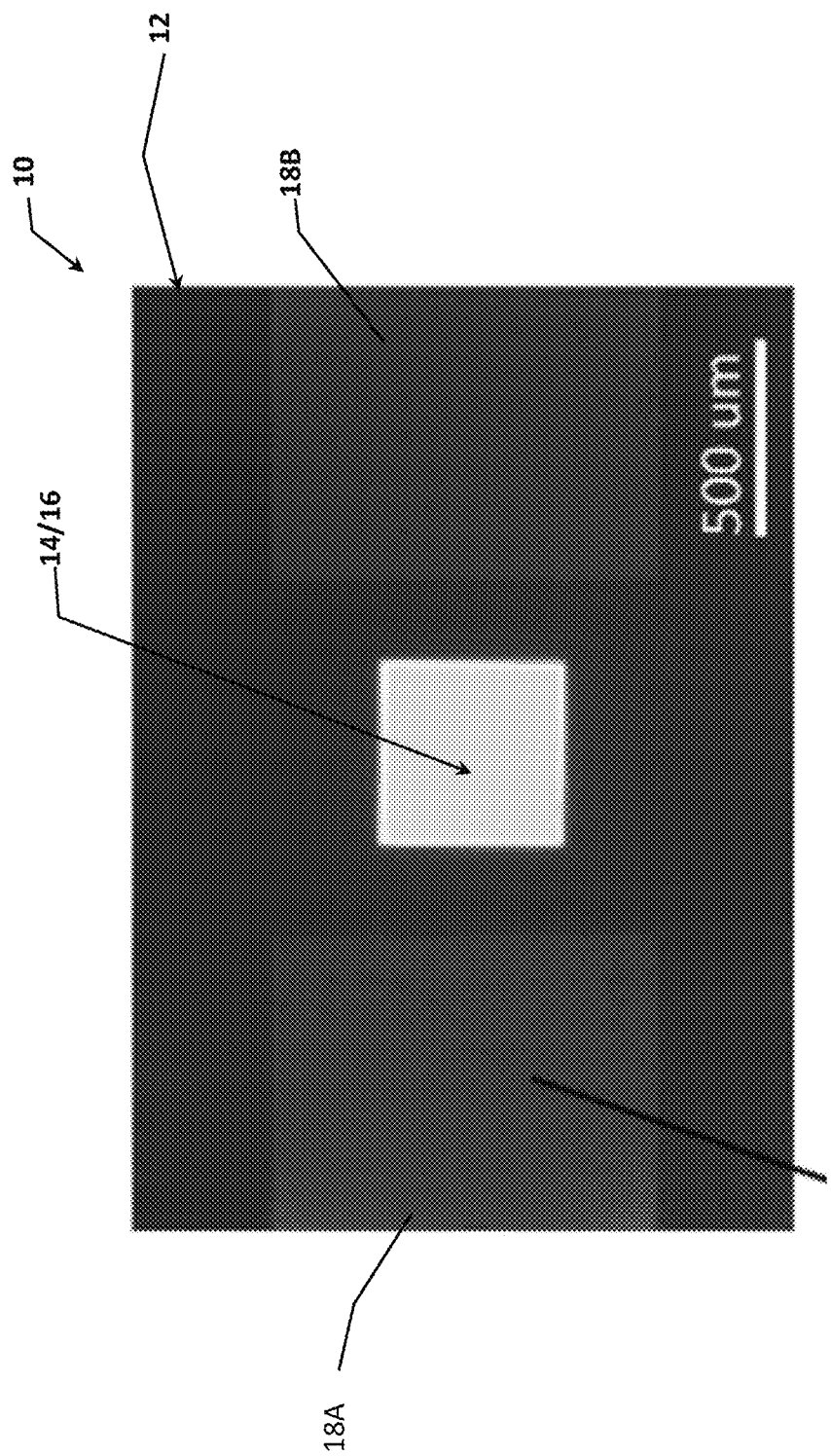
Figure 1C:
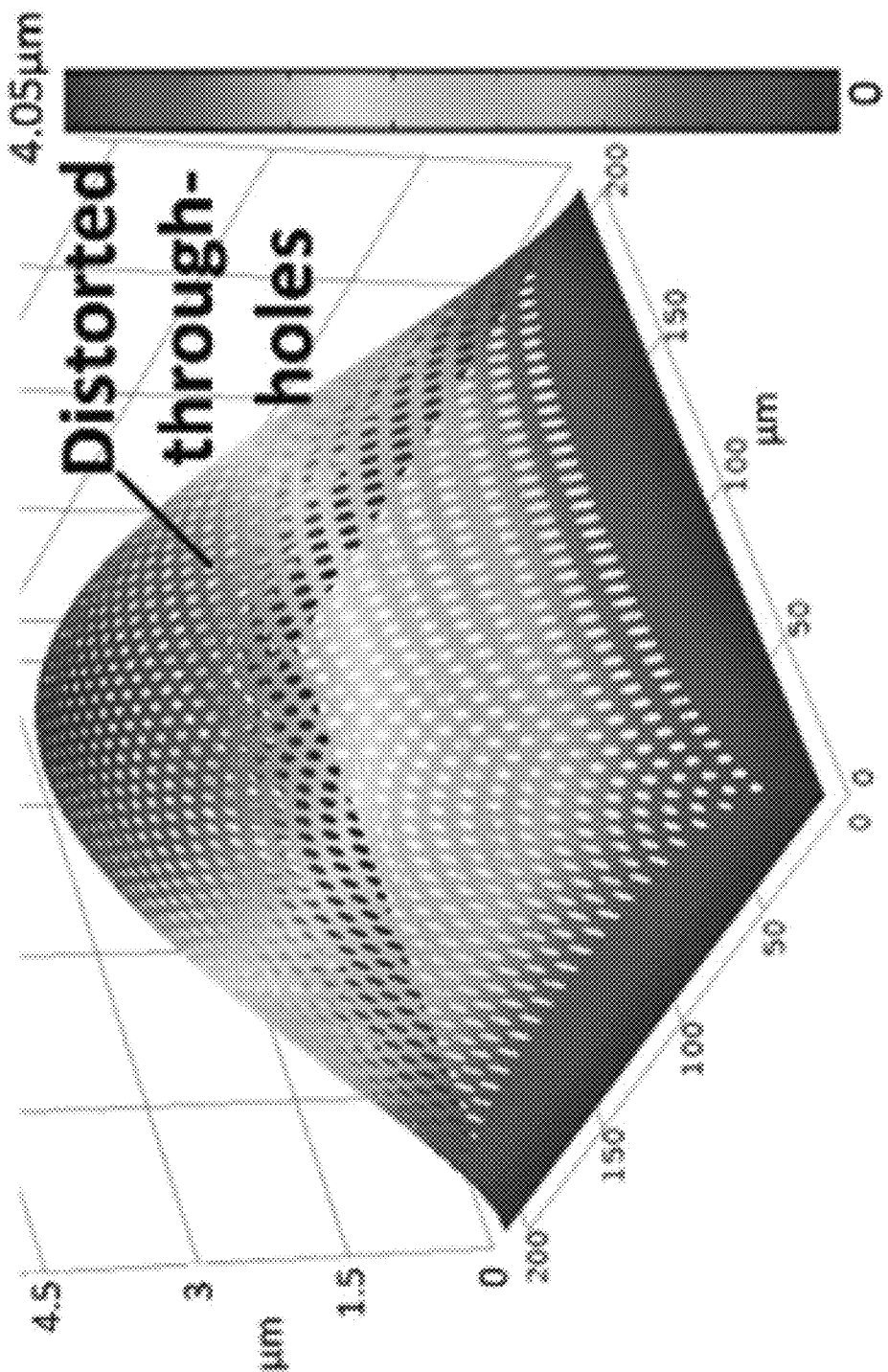

| | | | | |
|---|---|---|---|---|
| 2004/0040382 A1* | 3/2004 | Peterson | ............... | G01L 9/0042 |
| | | | | 73/708 |
| 2011/0260163 A1* | 10/2011 | Solzbacher | ........... | G01L 9/0054 |
| | | | | 257/53 |
| 2015/0020610 A1* | 1/2015 | Hurst | ...................... | G01L 1/146 |
| | | | | 73/862.68 |
| 2015/0381078 A1* | 12/2015 | Massoner | ........... | B81C 1/00658 |
| | | | | 310/300 |

OTHER PUBLICATIONS

Zhu, et al., "Graphene Based Piezoresistive Pressure Sensor", Applied Physics Letters, 4 pages, 2013.

Hurst, et al., "A Transconductive Graphene Pressure Sensor", IEEE, pp. 586-589, 2013.

Wang, et al., "Graphene "Microdrums" on a Freestanding Perforated Thin Membrane for High Sensitivity MEMS Pressure Sensors", Nanoscale, vol. 8, pp. 7663-7671, 2016.

\* cited by examiner

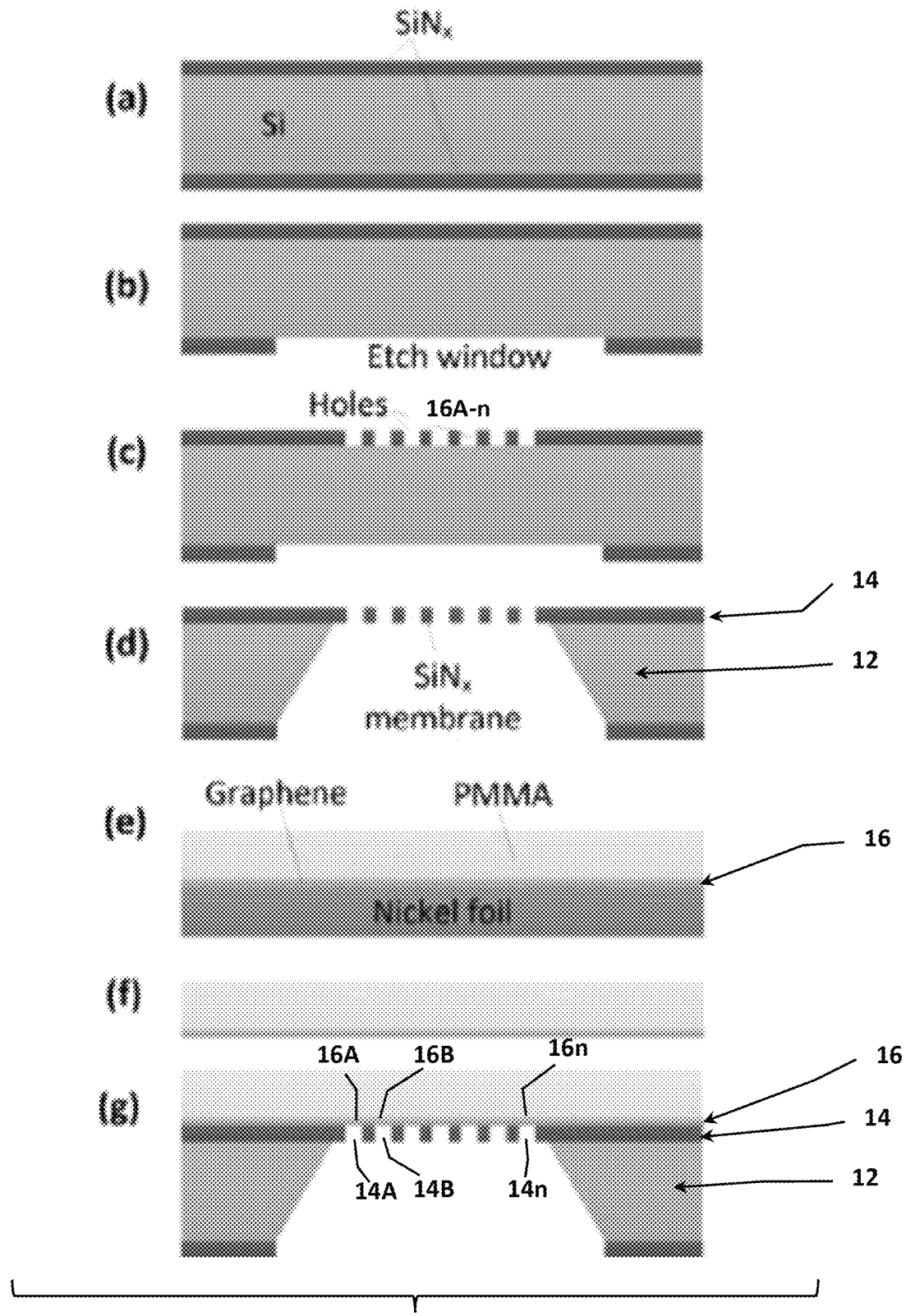
FIGURE 6 (part 1)

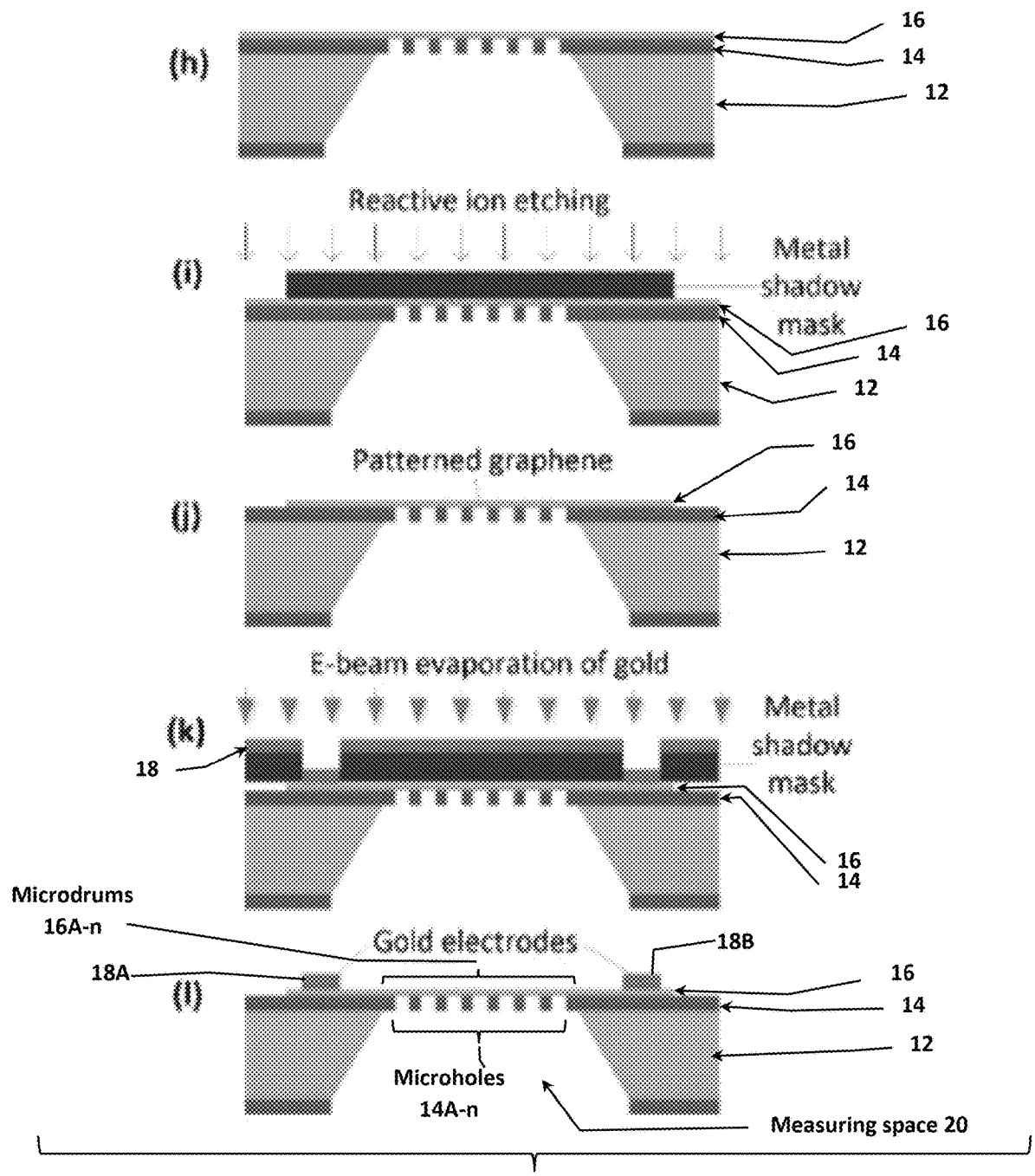
FIGURE 6 (part 2)

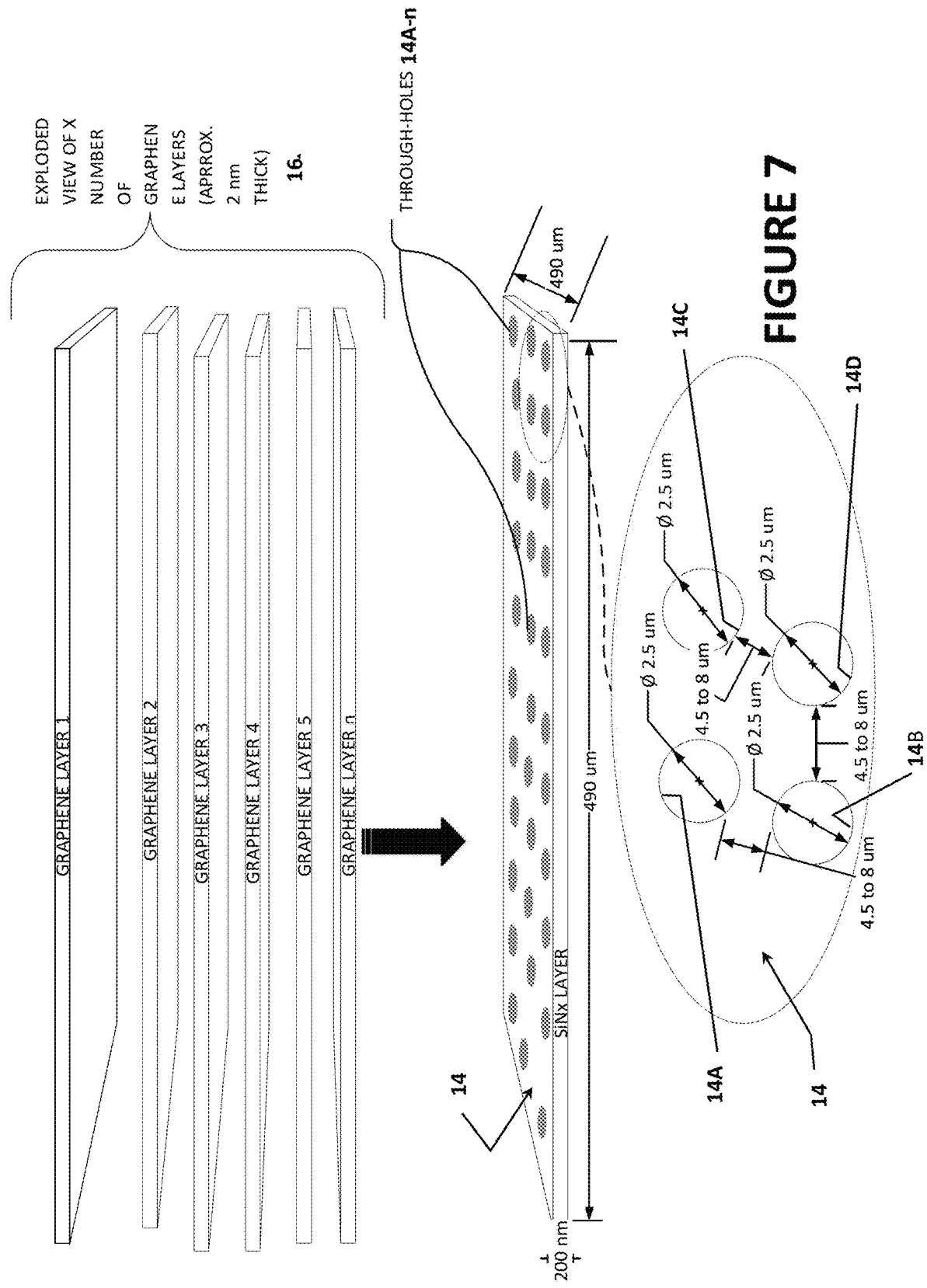

HIGH SENSITIVITY MEMS PRESSURE SENSOR

CROSS-REFERENCE TO RELATED APPLICATIONS

This application claims the benefit of Provisional Application U.S. Ser. No. 62/420,905 filed on Nov. 11, 2016, all of which is herein incorporated by reference in its entirety.

GOVERNMENT RIGHTS CLAUSE

This invention was made with Government support under Grant Number ECCS0954765 awarded by the National Science Foundation. The government has certain rights in the invention.

I. BACKGROUND OF THE INVENTION

A. Field of the Invention

The present invention relates to pressure sensors and, in particular, to MEMS pressure sensors.

B. Related Art

Graphene is a promising material for applications in micro-electro-mechanical systems (MEMS) owing to its atomic thickness, fast electron mobility,[1,2] and high Young's modulus.[3-5] Because a single layer of graphene is impermeable to standard gases including helium[6,7] and has strong adhesion to silicon oxide (Sift) substrates,[8] graphene has been suggested as an atomic thickness pressure sensor,[7] a separation barrier between two distinct regions,[9,10] and a high-performance drumhead resonator.[11] Recently, chemical vapor deposition (CVD) has enabled large-area uniform formation of single and few-layer graphene sheets on different substrates.[12-14] This ability, in conjunction with well-developed patterning and transferring methods for graphene sheets,[15-23] has opened up new opportunities for developing graphene-based sensors and actuators. Strain induced electrical-mechanical coupling in graphene is widely reported.[17,24-29] At present a few MEMS-based graphene pressure sensors have been demonstrated.[7,30-32] In a pioneering work on graphene pressure sensors, a graphene membrane was suspended over a shallow well etched into a SiO$_2$ layer grown on a silicon substrate, where the piezoresistive effect provided a direct electrical readout of pressure to strain transduction and was demonstrated to be independent of crystallographic orientation.[7] Another pressure sensor design involved forming a graphene membrane on a silicon nitride (SiN$_x$) membrane suspended over a micro-machined silicon base.[30,31] Also, a different pressure transducer was developed by using graphene flakes to cover an array of wells engraved into a fixed SiO$_2$ layer grown on a silicon substrate.[32] The aforementioned graphene-based MEMS pressure sensors have a compact sub-mm$^2$ footprint or even smaller. In another category of graphene-based pressure sensors, a large area graphene-polymer composite and laser-scribed graphene foam have been used as sensitive materials.[33,34] These sensors provided tremendous sensitivity, but had a large sensing area in the order of square centimeters or even larger.

References 7, 31, and 32 cited above and itemized below, are incorporated by reference herein for background information:

Ref [7]—D. Smith, F. Niklaus, A. Paussa, S. Vaziri, A. C. Fischer, M. Sterner, F. Forsberg, A. Delin, D. Esseni, P. Palestri, M. Ostling and M. C. Lemme, Nano Lett., 2013, 13, 3237-3242.

Ref [30]—H. Hosseinzadegan, C. Todd, A. Lal, M. Pandey, M. Levendorf and J. Park, "Graphene has ultra high piezoresistive gauge factor," 2012 IEEE 25TH INTERNATIONAL CONFERENCE ON MICRO ELECTRO MECHANICAL SYSTEMS (MEMS), Paris, 2012, pp. 611-614.

Ref [31]—S. E. Zhu, M. K. Ghatkesar, C. Zhang and G. C. A. M. Janssen, Appl. Phys. Lett., 2013, 102, 161904.

Ref [32]—A. M. Hurst, S. Lee, N. Petrone, J. VanDeWeert, A. M. van der Zande and J. Hone, Solid-State Sensors, Actuators and Microsystems (TRANSDUCERS & EUROSENSORS XXVII), 2013 Transducers & Eurosensors XXVII: The 17th International Conference, Barcelona, 2013, pp. 586-589.

The remarkable properties of graphene allow fabrication of a piezoresistive material that changes electrical properties with strain, in addition to being a thin film for high sensitivity to forces against it. There are other piezoresistive materials. Some can be fabricated as thin films. A few non-limiting examples are silicon, polysilicon, molybdenum-disulfide (MoS$_2$). However, there are competing and sometimes antagonistic factors regarding use of any thin film piezoresistive material, including graphene to transduce pressure from its gauge factor. Such factors can include not only piezoresistive performance in terms of sensitivity and accuracy but also such things as scalability, fabrication options, durability, cost, and practicality.

The inventors have identified room for improvement in this technical area.

II. SUMMARY OF THE INVENTION

A. Objects

It is a primary object, feature, aspect, or advantage of the present invention to provide a method, apparatus, or system for MEMS-based pressure sensing which improves over or solves problems and deficiencies in the state of the art.

Other objects, features, aspects, or advantages of the invention include an apparatus, method, or system as above-described which:
a. has a very small form factor, including microscale or MEMS scale;
b. exhibits higher gauge factor and sensitivity than at least many state of the art sensors over a wide range;
c. is relatively robust over a variety of operating conditions and environments;
d. can be relatively economically fabricated;
e. can be used in a variety of applications.

These and other objects, features, aspects, and advantages of the invention will become more apparent with reference to the accompanying specification.

B. Aspects

In one aspect of the invention, a method comprises highly sensitive MEMS-based pressure sensing by covering a thin perforated flexible membrane-type layer with a thin piezoresistive, piezoelectric, or otherwise piezo-effect membrane-type layer to form a thin flexible membrane assembly, suspending the membrane assembly across a measurement space, and measuring piezoresistive effect of the piezoresistive layer relative to applied pressure on the membrane assembly.

In another aspect of the invention, a MEMS-based pressure sensor apparatus comprises a membrane combination or assembly comprising a thin flexible perforated layer with micro-scale through-holes suspended across a measurement space. The membrane assembly includes a piezoresistive, piezoelectric, or otherwise piezo-effect layer. In one non-limiting example, the piezo-effect layer comprises graphene of one and several layers placed over one side of the perforated layer. Electrodes are connected to the piezo-effect layer. Piezoresistive or piezoelectric changes of the piezo-effect layer based on strain caused by differential pressure at the measurement space can be transduced through the electrodes and translated into pressure values.

In another aspect of the invention, a system of highly sensitive MEMS-based pressure sensing comprises using the apparatus described above to measure differential pressure at the suspended membrane assembly, translate the strain on the piezo-effect portion of the membrane assembly from the mechanical domain to the electrical domain, and use the electrical information to produce pressure values that can be read-out to a monitoring system. The pressure read-outs can be applied in a variety of contexts and ways.

In another aspect of the invention, a method of making a highly sensitive MEMS pressure sensor comprises steps of forming a thin, flexible membrane assembly by forming an array of microholes in a flexible layer, coating or adhering a piezo-effect layer over the microholes, suspending the flexible membrane assembly at opposite sides, and adding electrodes to the piezo-effect layer. The assembly creates a composite suspended flexible membrane that responds (e.g. flexes or bulges relative its suspension points) to differential pressure. The piezo-effect layer over the perforated layer responds both to flexing of the membrane assembly but also at what will be called a microdrum at each microhole. The response to flexing of the membrane assembly produces strain in the piezo-effect layer. The further local deformation of the piezo-effect layer at each microdrum produces increased strain. Cumulatively, an increased gauge factor is realized than without the microdrums, allowing improved sensitivity.

III. BRIEF DESCRIPTION OF THE DRAWINGS

The drawings include illustrations of the following:

FIG. 1: (a) Schematic of the proposed MEMS pressure sensor using a graphene membrane on a perforated $SiN_x$ thin membrane formed on a micro-machined silicon base. (b) Optical image of the fabricated pressure sensor. (c) Simulated deformation of the membrane and shape distortion of the through-holes. (d, e) SEM images of the graphene membrane on the perforated $SiN_x$ membrane. The white arrows in (e) indicate the locations of some pinholes in the graphene. The inset of (e) shows the standalone circular graphene microdrums. (f) Optical images of the sensor before and after applying a differential pressure of 400 mbar. (g) Measured surface profile of the graphene-perforated $SiN_x$ composite membrane along the line A-A' across the center of the membrane. The measurement was conducted using an Ambios XP-100 Stylus contact surface profiler.

FIG. 2: (a) Schematic of the equivalent circuit of the graphene sensing element connected into a Wheatstone bridge circuit. (b) Voltage response of the device to stepwise increasing differential pressures. (c) Voltage response of the device to rapid increase and gradual decrease in the applied differential pressure.

FIG. 3 (a): Voltage response of the sensor as a function of applied differential pressure at the temperatures of 23° C., 40° C., 55° C. and 70° C. (b) Relative change of graphene resistance as a function of environmental temperature without applying any differential pressure. The error bars in (a) and (b) were obtained by taking the standard deviation of six measurements for the device with the initial resistance of graphene $Rg=1215\Omega$ at 23° C.

FIG. 4: (a) Measured 3D surface profile of the graphene coated perforated nitride membrane under 415 mbar differential pressure. (b) Deflection profiles of the membrane across the middle line of the perforated membrane (parallel to the side of the membrane) under various differential pressures. (c) Maximum deflection at the center of the membrane as a function of differential pressure for the perforated and the imperforated membranes. The black and red dots are the experimental data. The black and red lines are the fitted curves obtained using eqn (5).

Figure 5A:
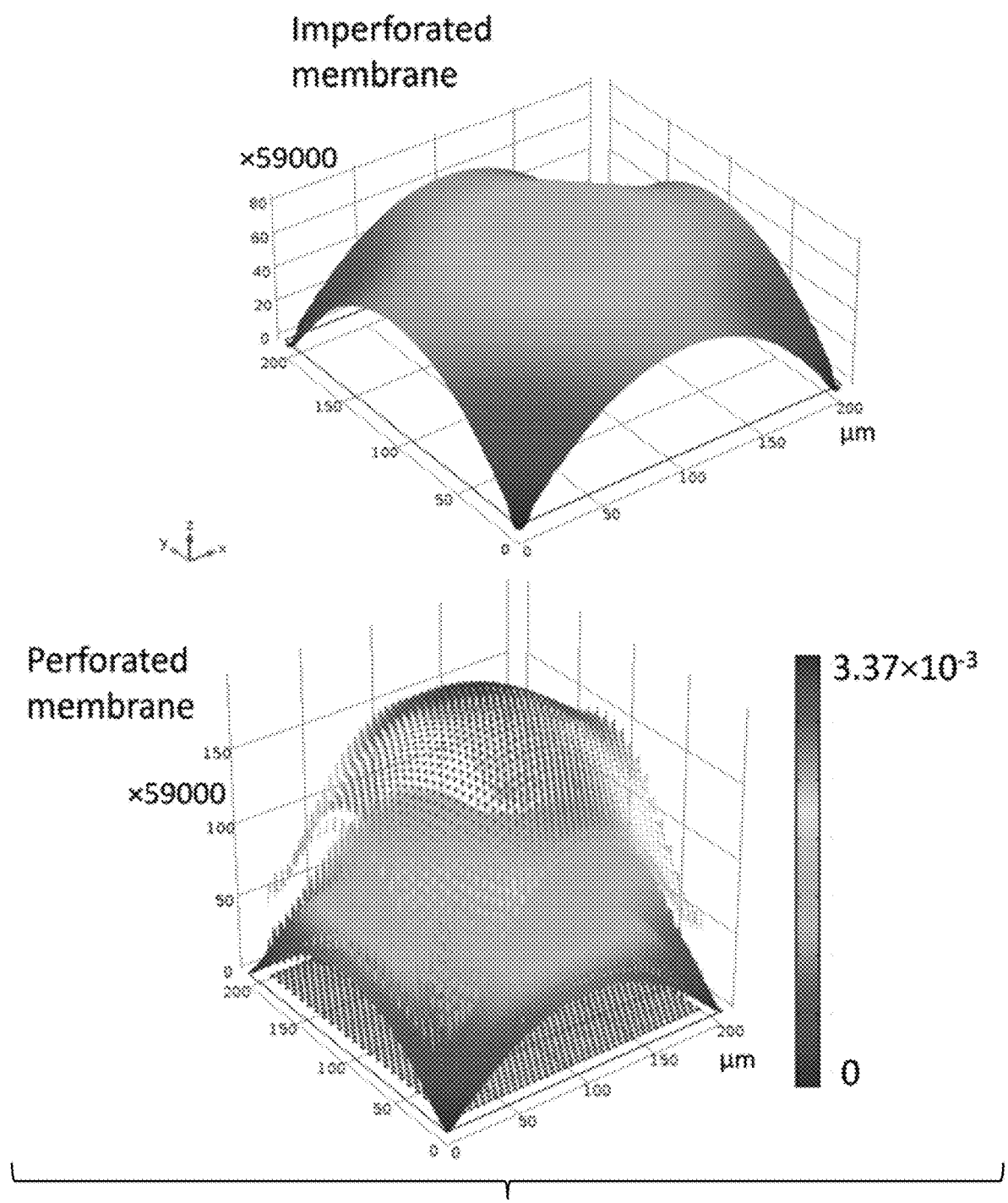
Figure 5B:
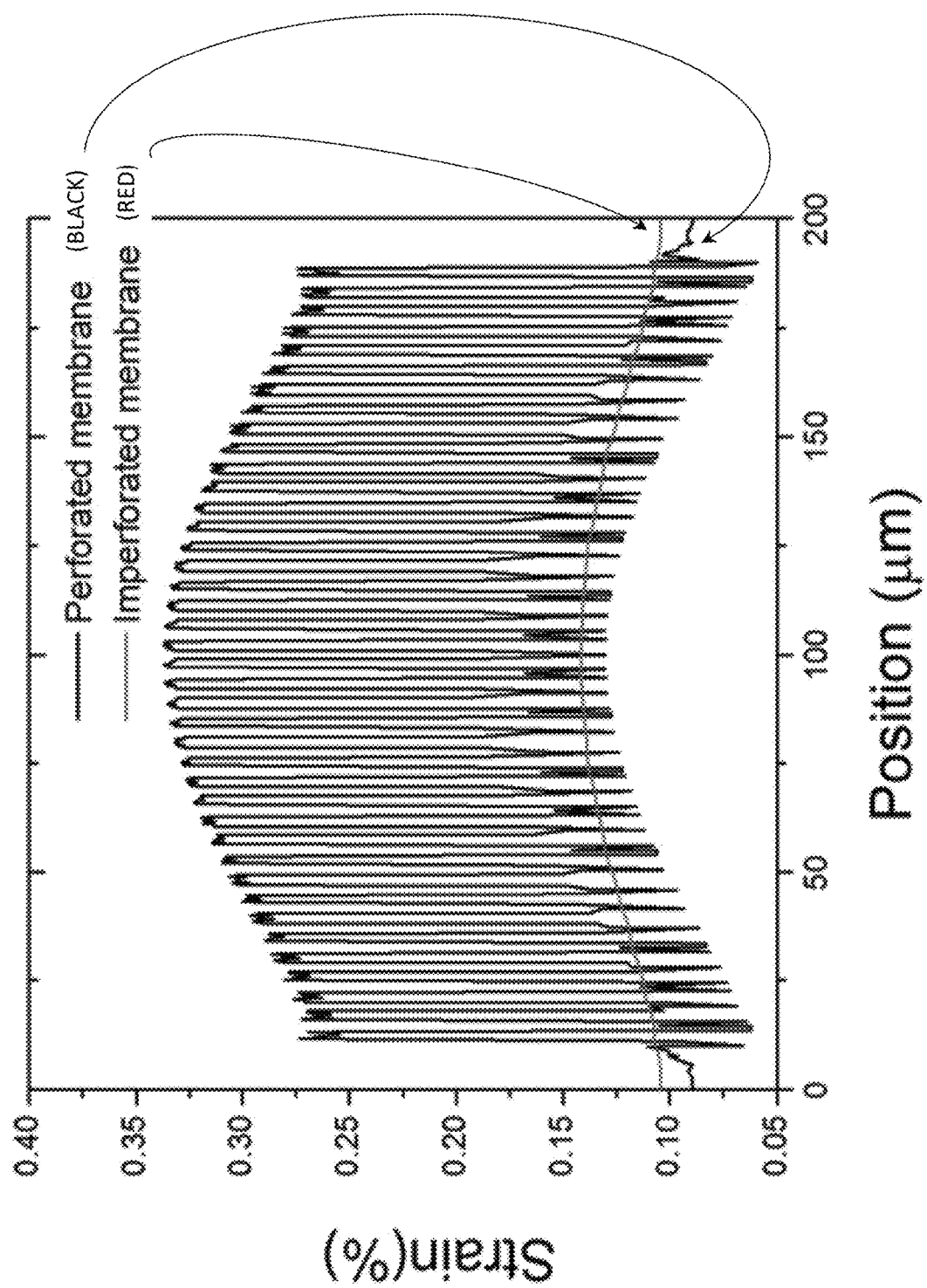

FIG. 5: (a) Simulated areal strain under a differential pressure of 500 mbar for the imperforated (left) and perforated (right) membranes. The z coordinate and the color scale show the amplitude of the areal strain. (b) The areal strain along the line across the center of the perforated and imperforated membranes. (c) Maximum deflection and average areal strain of the perforated membrane along the line across the center of the membrane as a function of the filling factor of the holes. Here the filling factor is defined as the ratio of the area of all the holes to the area of the whole membrane. The period of the holes was fixed to be 4.5 μm or 8.0 μm while the diameter of the holes gradually increased.

FIG. 6: Schematic of the fabrication processes for the device.

FIG. 7: Highly diagrammatic and not to scale exploded view of a flexible membrane of $SiN_x$ material perforated with micro-sized through-holes and covered by a few layers of graphene, including possible dimensions for one embodiment according to the invention.

IV. DETAILED DESCRIPTION OF EXEMPLARY EMBODIMENTS OF THE INVENTION

A. Overview

For a better understanding of the invention, a few examples of forms the invention can take will now be described in detail. It is to be understood that the following examples are neither inclusive nor exclusive of all forms and embodiments can take.

B. Example

A first example of the invention follows. See also, Wang, et al., Nanoscale, 2016, 8, 7663-7671, which is incorporated by reference herein in its entirety.

Graphene "Microdrums" on a Freestanding Perforated Thin Membrane for High Sensitivity MEMS Pressure Sensors We present a microelectromechanical system (MEMS) graphene-based pressure sensor realized by transferring a large area, few-layered graphene on a suspended silicon nitride thin membrane perforated by a periodic array of micro-through-holes. Each through-hole is covered by a circular drum-like graphene layer, namely a graphene "microdrum". The uniqueness of the sensor design is the fact that introducing the through-hole arrays into the supporting nitride membrane allows generating an increased strain in the graphene membrane over the through-hole array by local deformations of the holes under an applied differential pressure. Further reasons contributing to the increased strain in the devised sensitive membrane include larger deflection of the membrane than that of its imperforated counterpart membrane, and direct bulging of the graphene microdrum under an applied pressure. Electromechanical measurements show a gauge factor of 4.4 for the graphene membrane and a sensitivity of $2.8 \times 10^{-5}$ mbar$^{-1}$ for the pressure sensor with a good linearity over a wide pressure range. The present sensor outperforms most existing MEMS-based small footprint pressure sensors using graphene, silicon, and carbon nanotubes as sensitive materials, due to the high sensitivity.

1. Introduction

Graphene is a promising material for applications in micro-electro-mechanical systems (MEMS) owing to its atomic thick-ness, fast electron mobility,[1,2] and high Young's modulus.[3-5] Because a single layer of graphene is impermeable to standard gases including helium[6,7] and has strong adhesion to silicon oxide ($SiO_2$) substrates,[8] graphene has been suggested as an atomic thickness pressure sensor,[7] a separation barrier between two distinct regions,[9,10] and a high-performance drumhead resonator.[11] Recently, chemical vapor deposition (CVD) has enabled large-area uniform formation of single and few-layer graphene sheets on different substrates.[12-14] This ability, in conjunction with well-developed patterning and transferring methods for graphene sheets,[15-23] has opened up new opportunities for developing graphene-based sensors and actuators. Strain induced electrical-mechanical coupling in graphene is widely reported.[17,24-29] At present a few MEMS-based graphene pressure sensors have been demonstrated.[7,30-32] In a pioneering work on graphene pressure sensors, a graphene membrane was suspended over a shallow well etched into a $SiO_2$ layer grown on a silicon substrate, where the piezoresistive effect provided a direct electrical readout of pressure to strain transduction and was demonstrated to be independent of crystallographic orientation.[7] Another remarkable pressure sensor design involved forming a graphene membrane on a silicon nitride ($SiN_x$) membrane suspended over a micromachined silicon base.[30,31] Also, a different pressure transducer was developed by using graphene flakes to cover an array of wells engraved into a fixed $SiO_2$ layer grown on a silicon substrate.[32] The aforementioned graphene-based MEMS pressure sensors have a compact sub-mm$^2$ footprint or even smaller. In another category of graphene-based pressure sensors, a large area graphene-polymer composite and laser-scribed graphene foam have been used as sensitive materials.[33,34] These sensors provided tremendous sensitivity, but had a large sensing area in the order of square centimeters or even larger.

We report on a high sensitivity, small area MEMS pressure sensor 10 using few-layered graphene 16 on a flexible perforated $SiN_x$ thin membrane 14 (FIG. 1(a and b)). The $SiN_x$ membrane 14 acts as a supporting layer for the graphene membrane 16 and has a periodic array of microsized through-holes 14A, B, C, . . . , n (FIG. 1(d)). Therefore, an array of circular drum-like graphene structures, namely graphene "microdrums" 16A, B, C, . . . , n, are formed above these through-holes 14A, B, C, (FIG. 1(e)). Compared to the previously reported sensor designs using a standalone graphene membrane[7] and an imperforated nitride-graphene composite membrane[31] as sensing elements, the introduction of the microsized through-hole array 14A-n into the supporting membrane 14 allows generating an increased membrane strain locally in the graphene layer 16 over the holes 16A-n (FIG. 1(c)). Further reasons which add to obtaining a large strain change in graphene 16 and thus a high pressure sensitivity of the sensor 10 include the facts that the perforated membrane 14 deflects more than an imperforated counterpart membrane of the same dimensions, and that the graphene microdrums 16A-n are pressurized to bulge up under an applied pressure.

To prove this device concept, we fabricated a perforated $SiN_x$ square membrane (490×490 μm$^2$) by depositing 200±2.7 nm thick nitride on a silicon substrate and patterning with 2.5 μm-diameter holes, followed by removing silicon below the membrane. Subsequently, a few-layered graphene membrane (~2 nm thick or ~6 atomic layers) was transferred on the perforated nitride membrane.[18] The nitride membrane was pre-treated with oxygen plasma to improve the van der Waals interactions between the graphene and nitride membrane.[35-37] After that, the graphene resistor pattern was patterned with the help of a metal shadow mask. Lastly, metal contacts were formed by using the shadow mask evaporation of gold. See the Methods section for details of device fabrication. To test the fabricated device, the backside of the device was adhered to the outlet of a Plexiglas-based air channel. Air pressure was applied from the inlet of the air channel using a programmable syringe pump. A commercial differential pressure sensor was used to measure differential pressures applied across the sensitive membrane. See the Methods section for details of the testing setup.

Figure 1D:
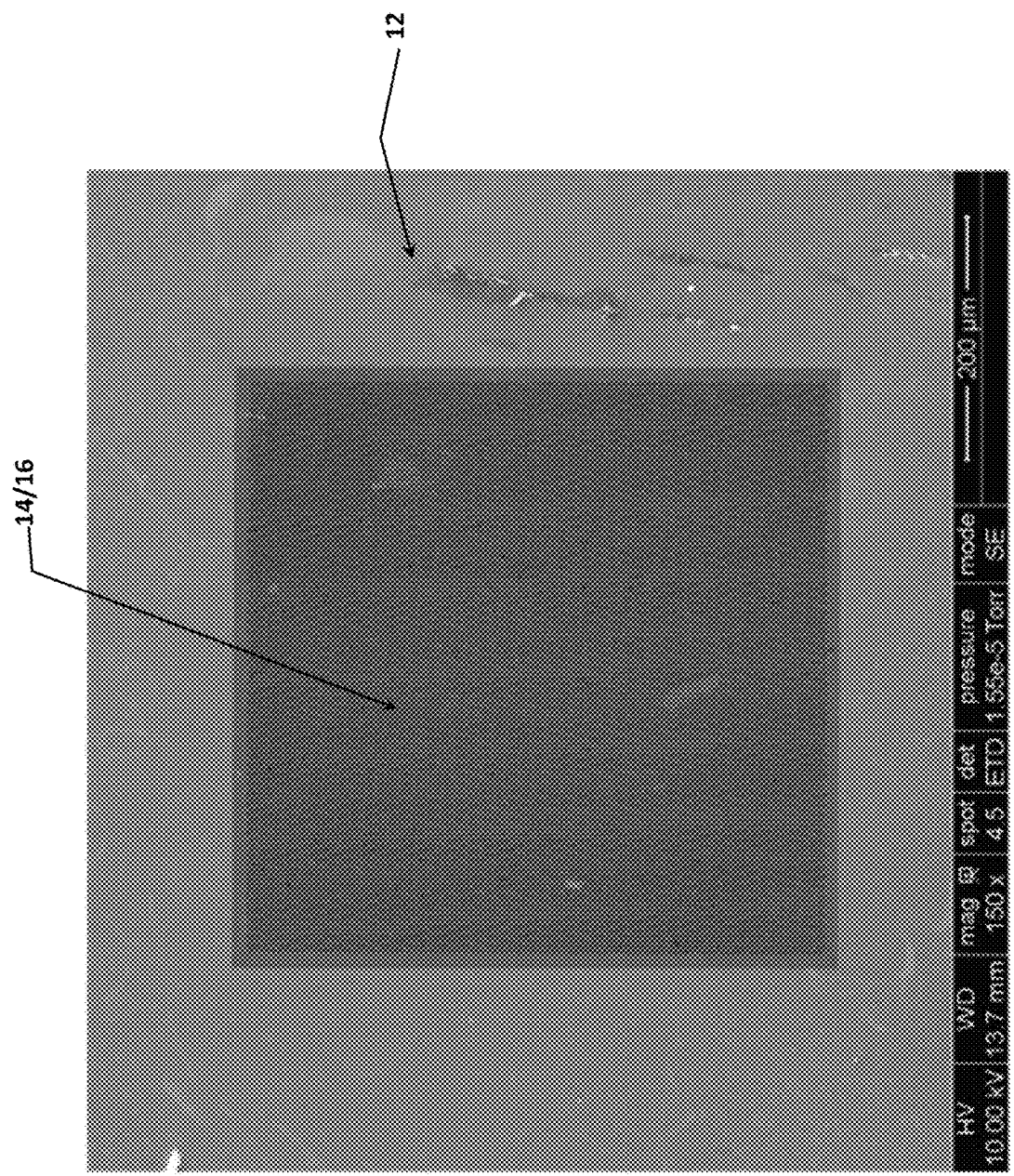
Figure 1E:
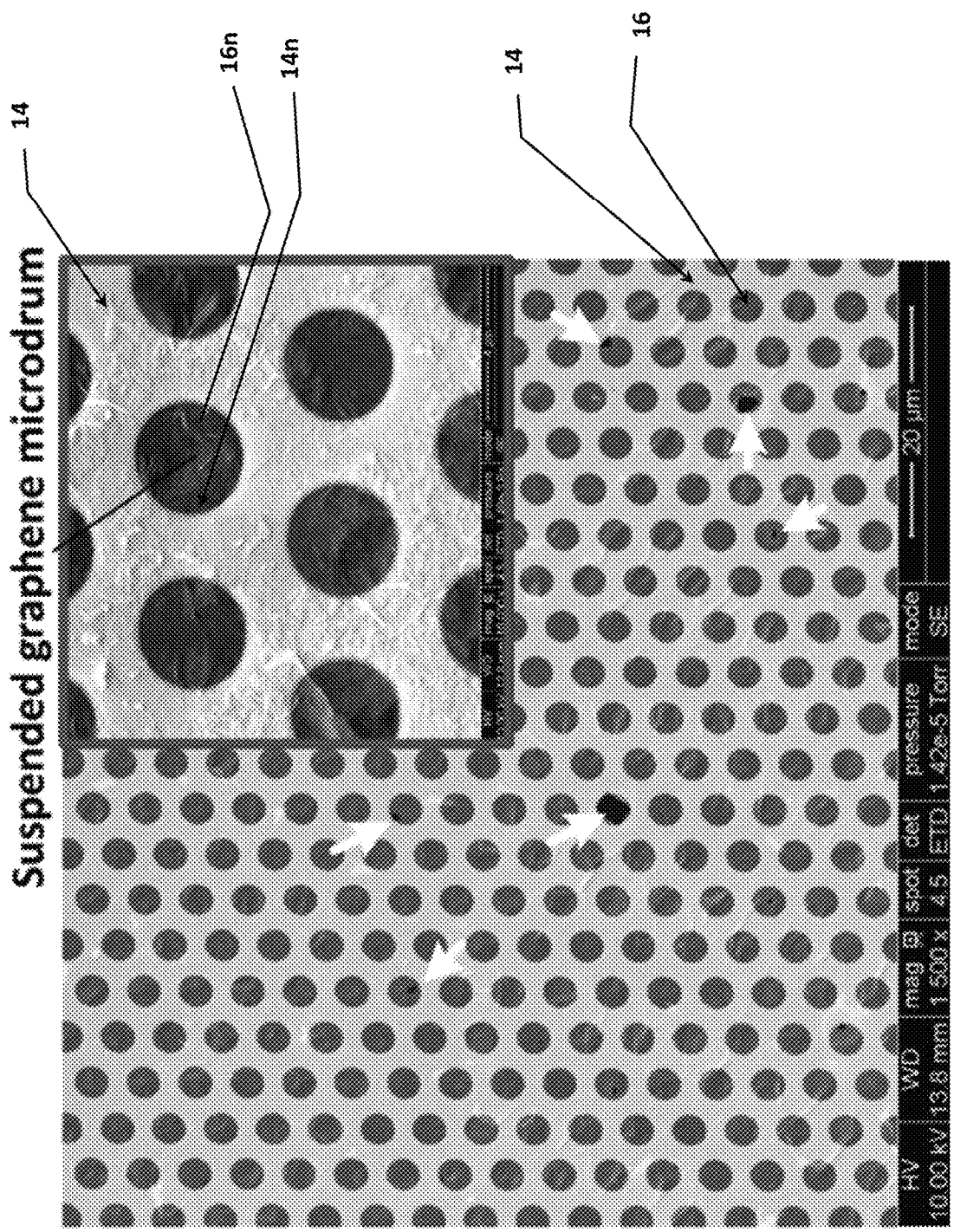
Figure 1F:
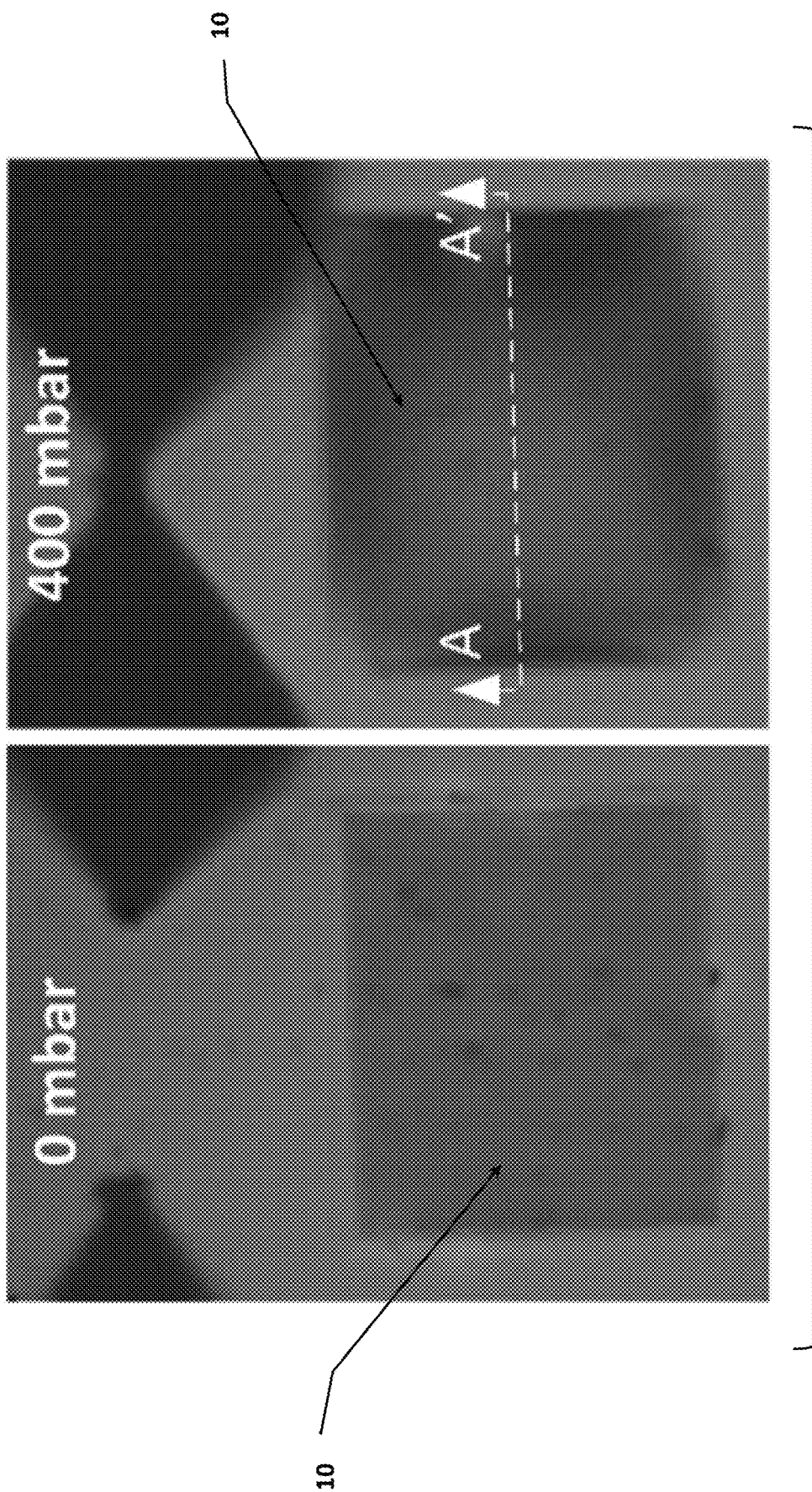
Figure 1G:
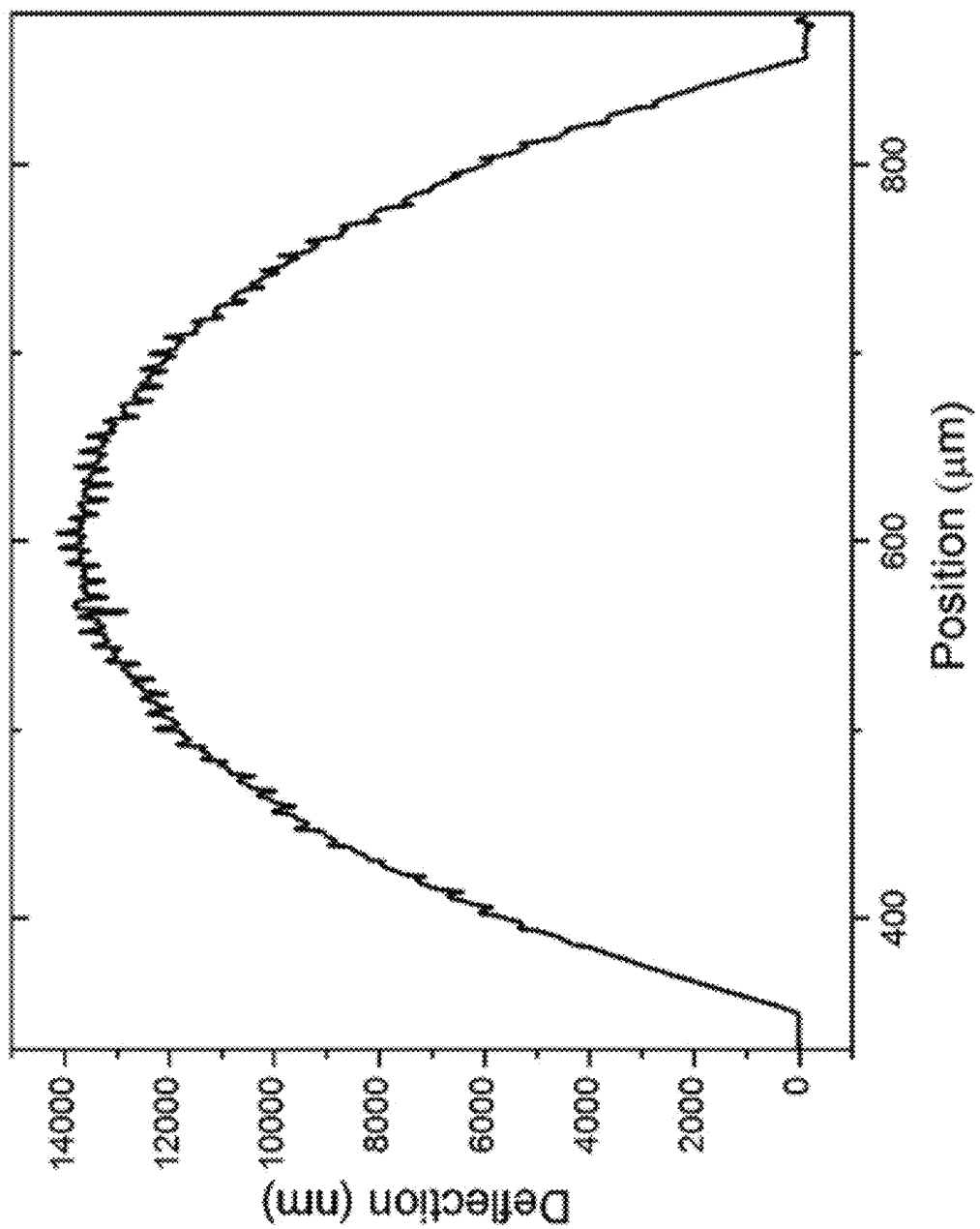

FIG. 1(d) shows the surface coverage of graphene 16 on the perforated nitride membrane 14 suspended over the micromachined silicon base 12. Only a few pinholes were observed in the graphene membrane 16 (see arrows in FIG. 1(e)), which may be introduced during the graphene deposition and/or the transfer process. To confirm that the graphene membrane 16 stayed bonded with the nitride membrane 14 within a range of applied pressures, we performed a contact profile measurement (FIG. 1(f)). FIG. 1(g) shows that the measured maximum deflection of the composite membrane or membrane assembly 14/16 is 14.1 μm at a differential pressure of 400 mbar. Let us assume that the pressurized graphene 16 is totally detached from the supporting membrane 14. Then, according to mechanical simulations, a maximum deflection of 46 μm will be expected at the center of the membrane 14, which is much larger than the measured deflection mentioned above. Therefore, it was likely that the graphene 16 adhered well to the nitride membrane 14. In fact, no detachment of the graphene 16 from the perforated nitride membrane 14 was observed even when the membrane 14/16 popped out under an air pressure of ~600 mbar.

Figure 2A:
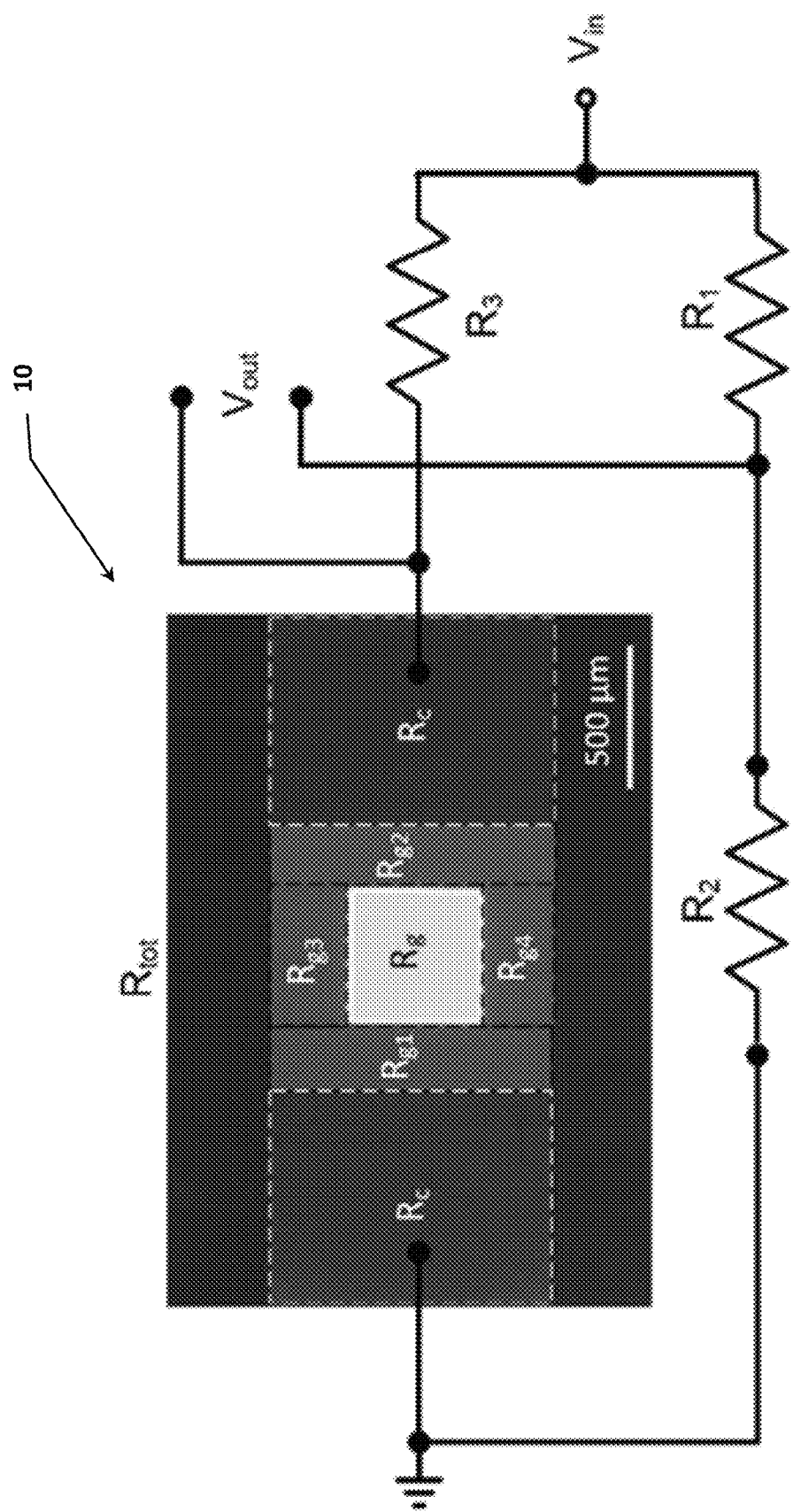

The piezoresistive effect of the graphene sensor 10 was measured with a Wheatstone bridge circuit (FIG. 2(a)). A small input voltage of 20 mV was applied across the junctions of two shunt resistive circuits. The total resistance of the graphene sensor $R_{tot}$ is composed of $R_g$ of the graphene on the suspended square membrane, $R_{g1}$, $R_{g2}$, $R_{g3}$ and $R_{g4}$ of graphene in the surrounding regions, and the contact resistance $R_c$ between the metal contacts 18A and B and graphene 16. The measured $R_{tot}$ for twelve devices varied between 1170Ω and 1256Ω, which presumably arose from slight manufacturing inconsistencies during the graphene patterning and transferring steps for these devices. The device given in FIG. 2(a) had $R_{tot}$=1215Ω at room temperature (23° C.). The relative resistance change of the sensor $\Delta R_{tot}/R_{tot}$ can be related to the output and input voltages ($V_{out}$ and $V_{in}$) of the sensor by eqn (1):

$$V_{out} = V_{in}\left(\frac{R_3}{R_3 + R_{tot}} - \frac{R_2}{R_1 + R_2}\right) \quad (1)$$

where $R_1$ and $R_2$ were chosen to be the same and $R_3$ was adjusted until a balanced bridge circuit was obtained. The output voltage variation is quasi-linearly proportional to $\Delta R_{tot}$ and described as:

$$\frac{V_{out}}{V_{in}} \approx \frac{\Delta R_{tot}}{4R_{tot}} \quad (2)$$

Figure 4A:
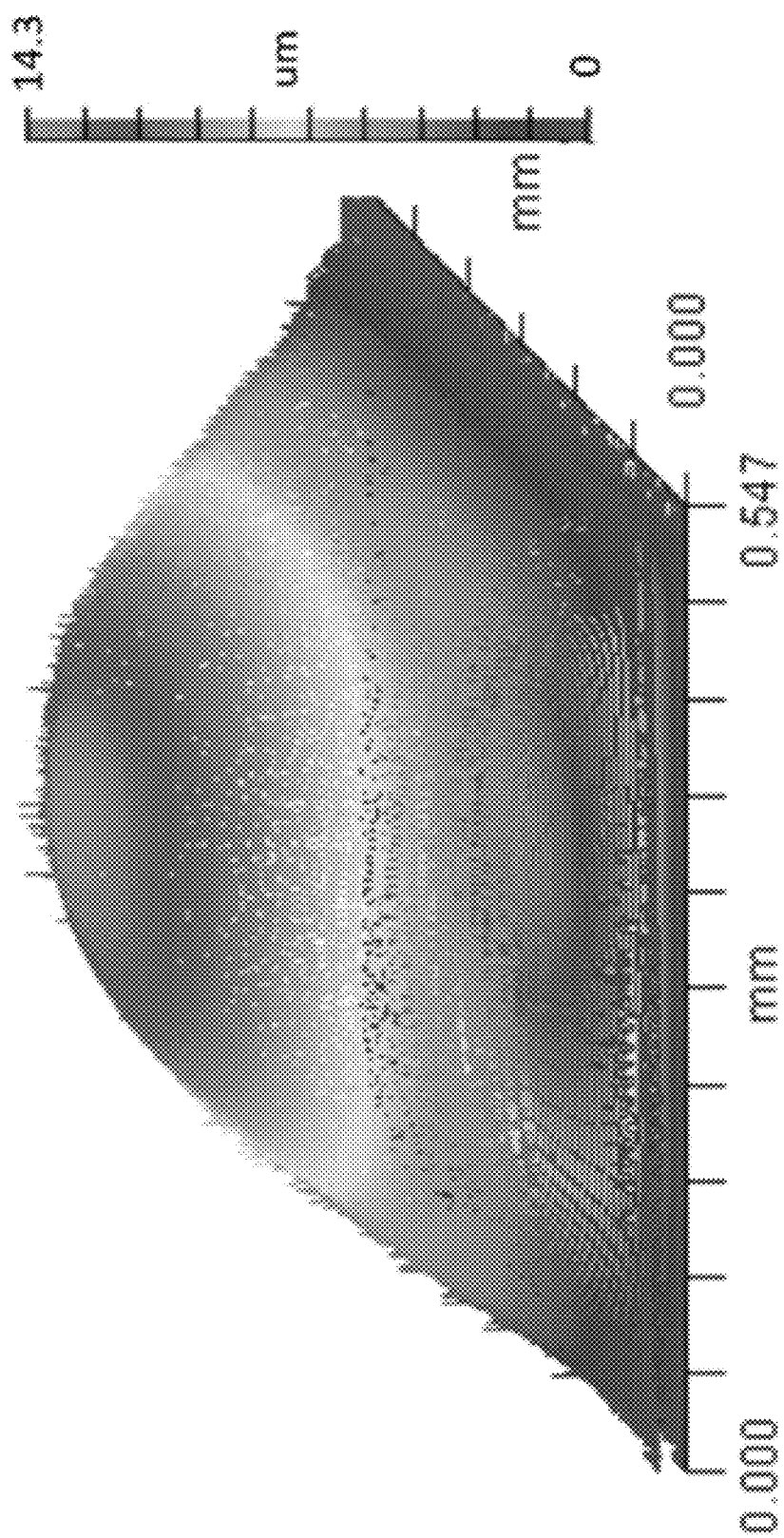
Figure 4B:
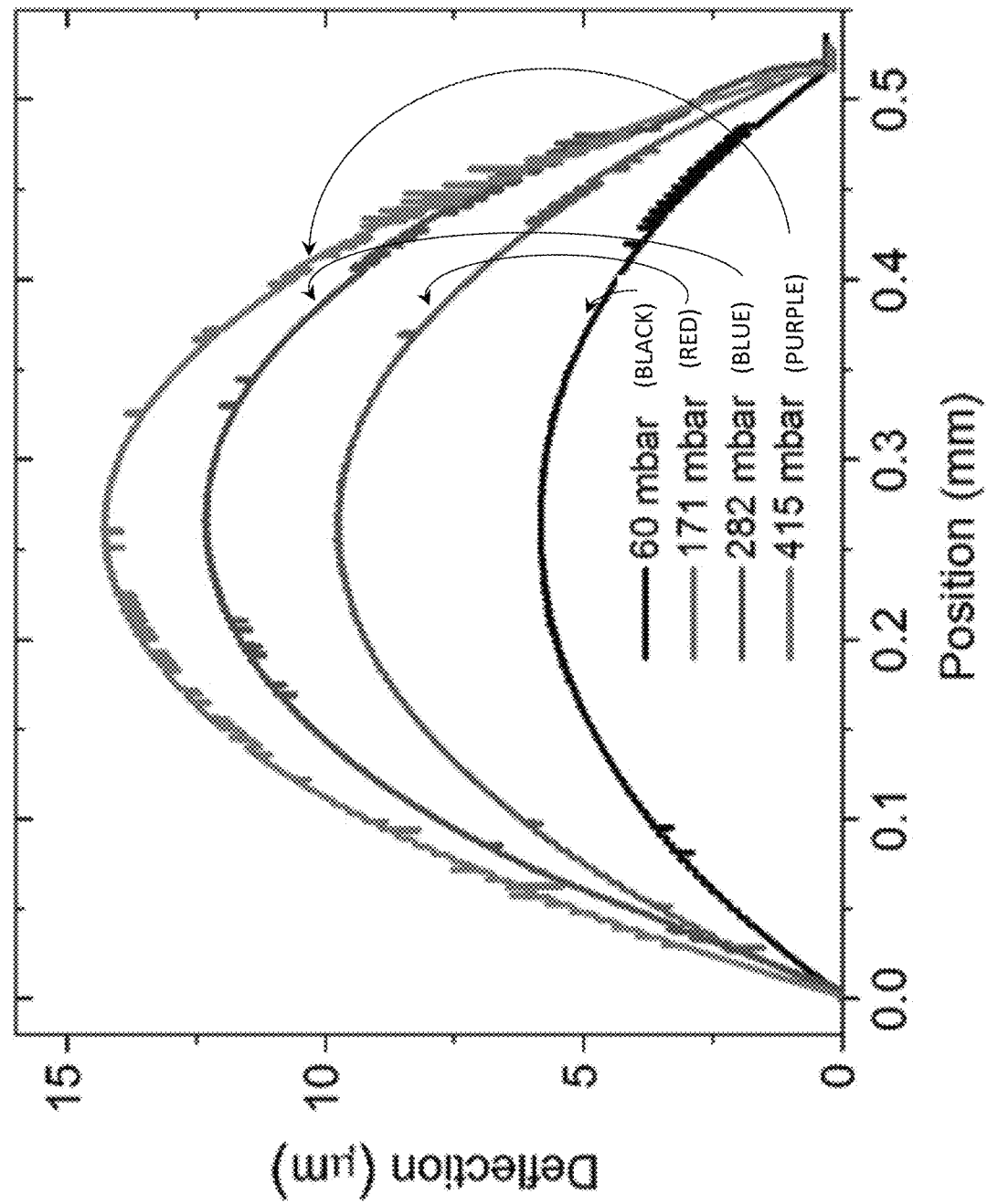

Based on the equivalent circuit of the sensor shown in FIG. 4(a), $R_{tot}$ is expressed in eqn (3):

$$R_{tot} = R_{g1} + \frac{1}{\frac{1}{R_{g3}} + \frac{1}{R_g} + \frac{1}{R_{g4}}} + R_{g2} + 2R_c \quad (3)$$

The dimensions for different regions of the patterned graphene (FIG. 2(a)) are as follows: 224×978 μm$^2$ for $R_{g1}$, 201×978 μm$^2$ for $R_{g2}$, 500×261 μm$^2$ for $R_{g3}$, and 500×246 μm$^2$ for $R_{g4}$. As a result, the relationship between $\Delta R_{tot}$ and $\Delta R_g$ is obtained in eqn (4):

$$\Delta R_{tot} \approx \frac{\Delta R_g}{\left(1 + \frac{R_g}{R_{g3}} + \frac{R_g}{R_{g4}}\right)^2} \quad (4)$$

Based on the dimensions of each resistive element in FIG. 2(a), the graphene 16n on the suspended square membrane 14n is estimated to be $R_g$=1473Ω. The relative resistance change of this part 16n of the graphene 16 can be written as $\Delta R_g/R_g$=3.6$\Delta R_{tot}/R_{tot}$. As $R_{g3}$ and $R_{g4}$ are in parallel with $R_g$, their values can largely influence the measured electrical signal. If $R_{g3}$ and $R_{g4}$ become too low (or graphene 16 in the side regions is too wide), the output voltage signal will be greatly suppressed. However, in our design, the two parallel resistors $R_{g3}$ and $R_{g4}$ are not totally removed. The reason for keeping $R_{g3}$ and $R_{g4}$ is from a practical standpoint as follows. As mentioned earlier, our fabrication process utilized a metal shadow mask to form the graphene pattern on the device surface. Although using the metal shadow mask simplified the device fabrication process, the accuracy of aligning the shadow mask and the suspended SiN$_x$ thin membrane 14 was relatively low (~100 μm). To avoid misaligning the edges of the graphene pattern 16 into the perforated SiN$_x$ membrane region, we intended to leave graphene on the two side regions ($R_{g3}$ and $R_{g4}$) of the device 10 (otherwise, significant air leakage may occur at the membrane). Therefore, the present design sacrificed some of the sensitivity of the sensor but gained the simplicity of the device fabrication. By optimizing the fabrication processes, it is possible to further increase the sensitivity of the device.

2. Results and Discussion

Figure 2B:
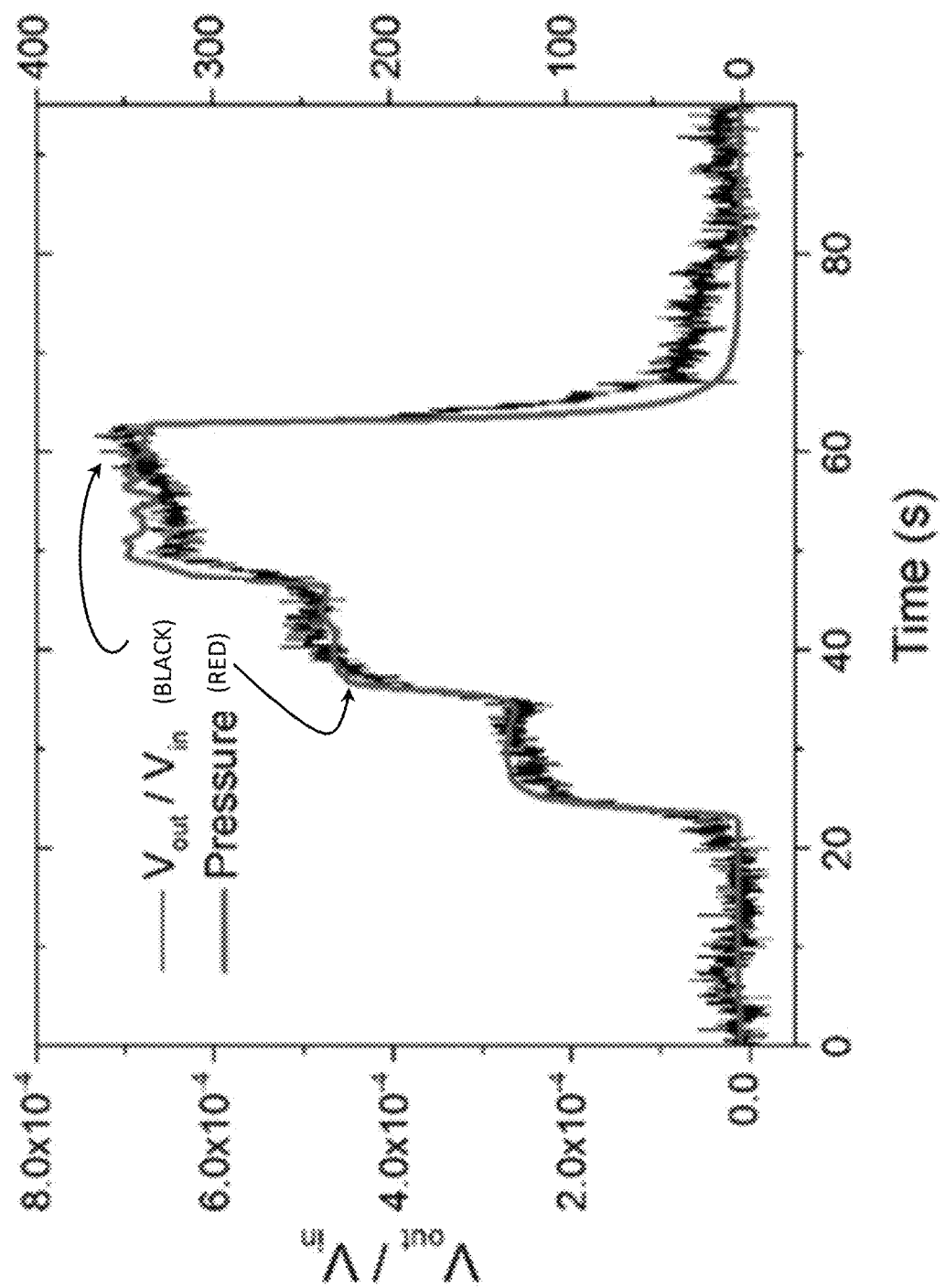

FIG. 2(b) shows the output voltage normalized to the input voltage of the device 10 responding to an increase in the step-like differential pressure. The output voltage rose with an increasing air pressure applied to the graphene-perforated membrane. At a differential pressure of 350 mbar, 0.067% relative change was observed at the output voltage, corresponding to 0.97% change in the resistance. The rapid rise of the output signal indicates an immediate piezoresistive response to the pressure applied to the membrane 14/16. Based on the noise floor of the output signal shown in FIG. 2(b), the noise equivalent pressure resolution of the sensor is about 30 mbar, which can be further improved by optimizing the detection circuit, e.g., using a low-pass filter and a low-noise amplifier.

Figure 2C:
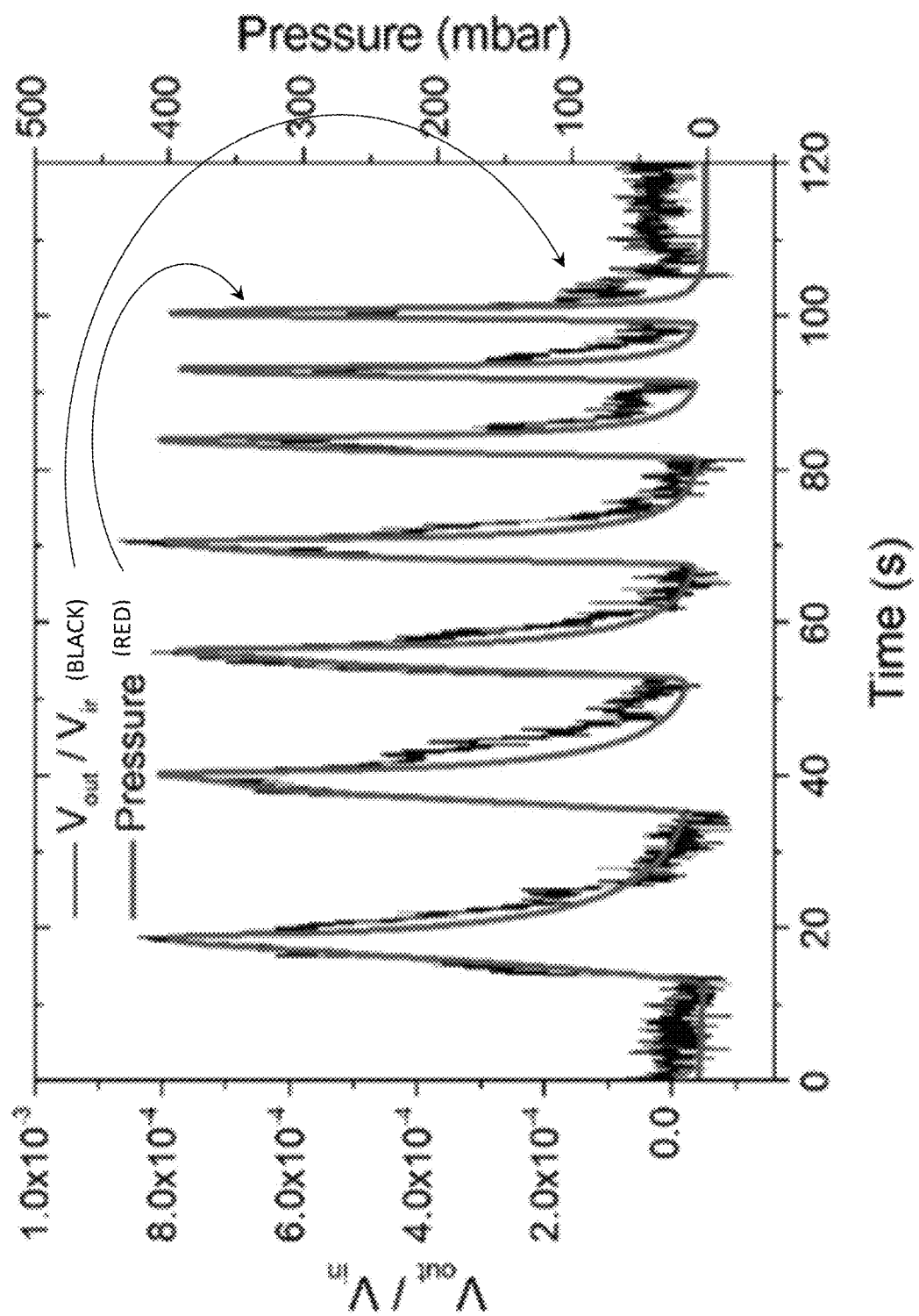

FIG. 2(d) shows the results of cyclic pressure testing for the device 10. The experiment involved rapidly applying differential air pressure to the sensitive membrane 14/16 by pumping air and then gradually releasing the pressure. In FIG. 2(c), the pressure pump time was controlled from 7 s to 1.5 s while the pressure release time was decreased from 18 s to 2 s by adjusting the air pumping and withdrawal speed of the pressure control apparatus. It is clear that upon applying an air pressure, the output voltage was able to quickly follow the sudden increase of the internal pressure and then go back to the baseline. The response time here is mainly determined by the pump and vent speed, so the actual response time is expected to be faster.

Figure 3A:
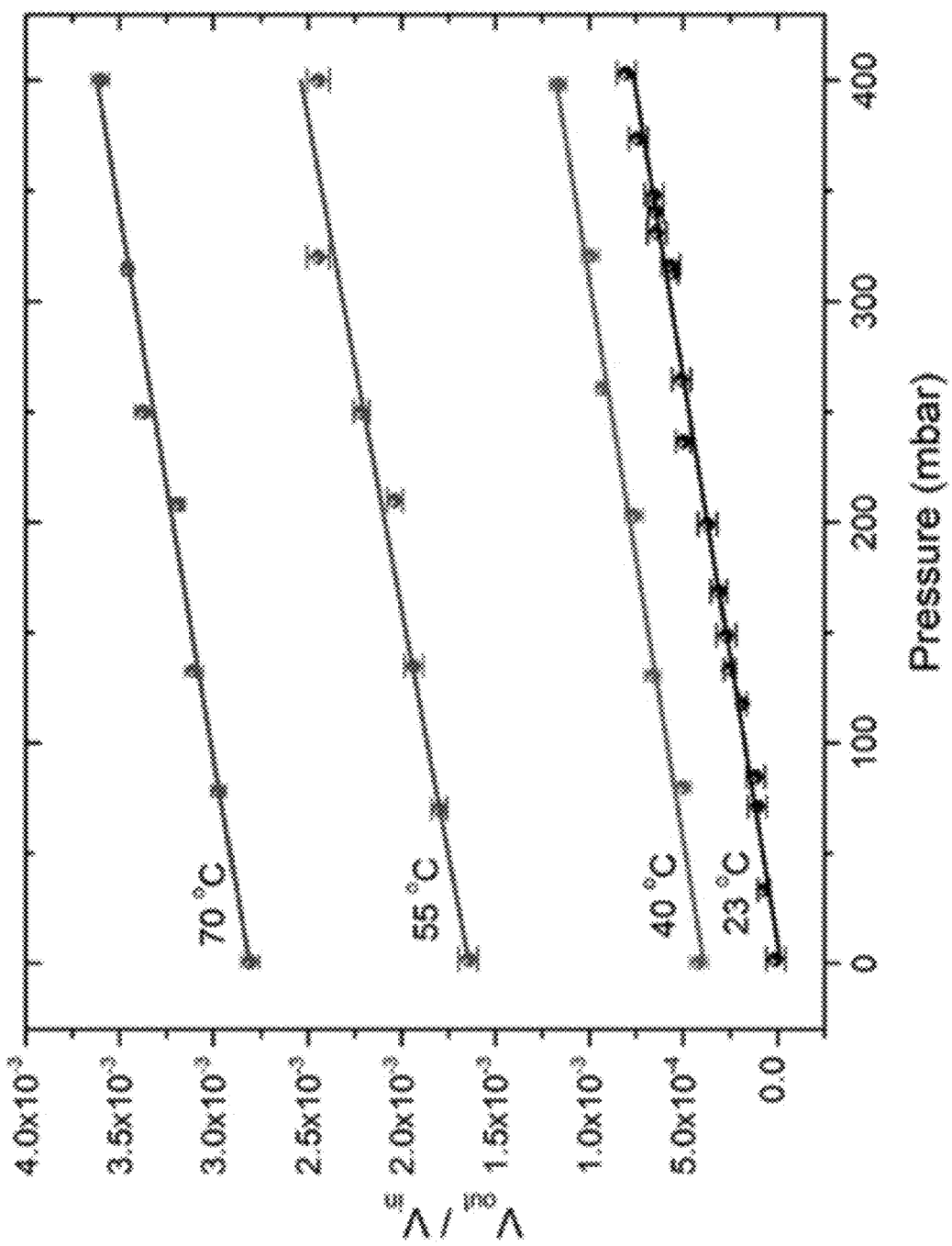

FIG. 3(a) shows the response of $V_{out}/V_{in}$ to applied differential pressure. In order to investigate the influence of temperature on the sensitivity, the device 10 was measured at different temperatures. At 23° C., a good linearity was observed and a sensitivity of 3.88×10$^{-5}$ mV mbar$^{-1}$ was obtained. The gauge factor G of graphene for the sensor 10 was estimated by $$G = \frac{\Delta R/R}{\Delta L/L} = 4.4 \text{ at } 350 \text{ mbar.}$$

Figure 3B:
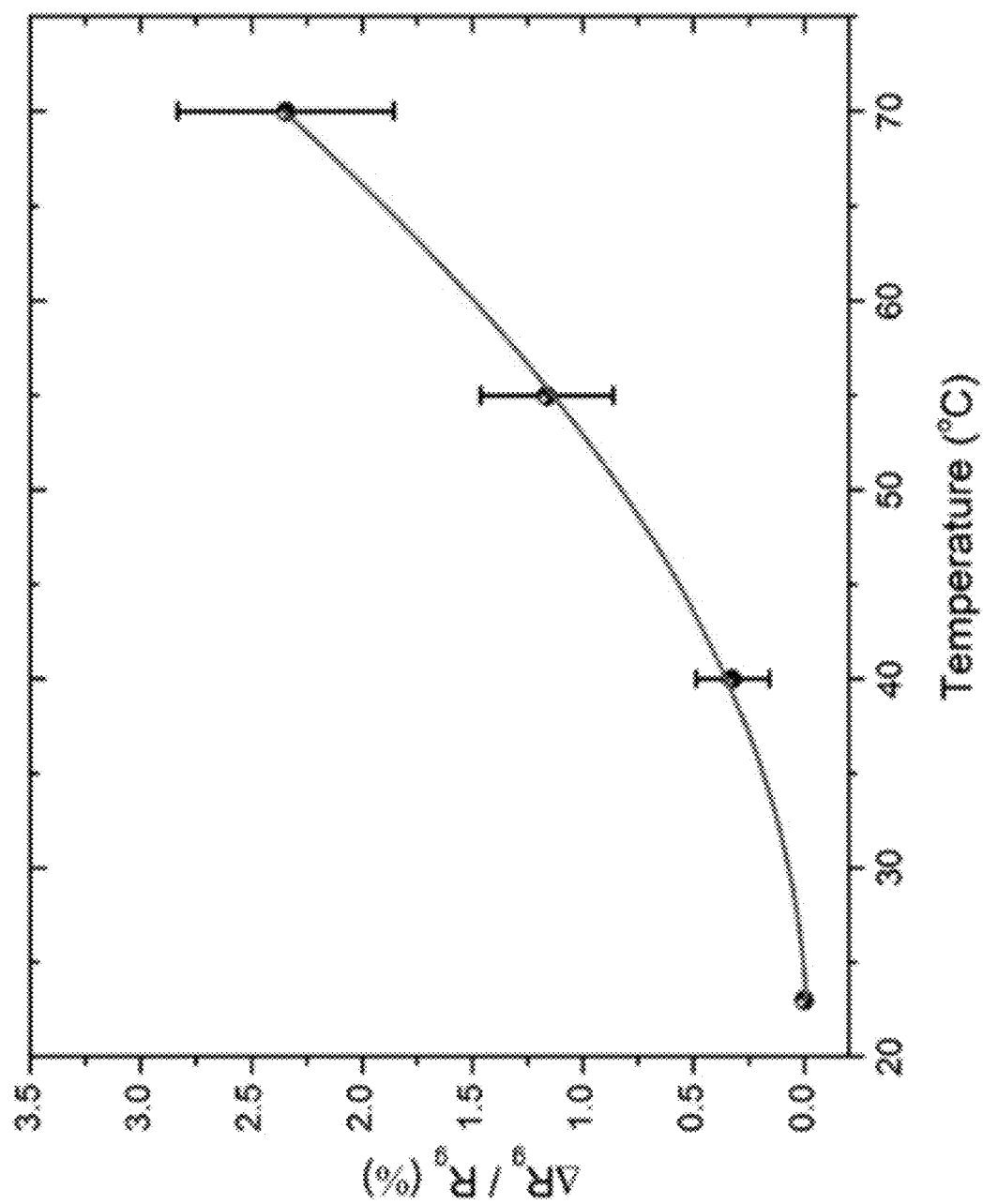

Here, the average strain of the suspended square membrane 14/16 was calculated to be 0.22% for 14.3 μm deflection at the center of the membrane 14/16.[38] The obtained gauge factor of the graphene 16 used here is comparable to other reported CVD-grown graphene.[7,26,31] For example, the reported gauge factor is 2.92 for the standalone graphene,[7] 6.1 for the graphene on the poly(dimethylsiloxane) substrate,[26] and 1.6 for the graphene on the SiN$_x$ membrane.[31] As the environmental temperature increased from room temperature to 70° C., the response of $V_{out}/V_{in}$ showed an overall increase and had a good linear dependence on the applied pressure. The slopes of the linearly fitted curves at different temperatures were almost unchanged, indicating that within the tested temperature range, the temperature variations actually did not degrade the sensitivity of the device. FIG. 3(b) plots the change of the graphene resistance with an increasing temperature.

A nonlinear positive temperature coefficient of the graphene resistance is observed, which is similar to the previously reported result.[2] At 70° C., the resistance of graphene increased by 2.3% compared to that at 23° C.

Figure 4C:
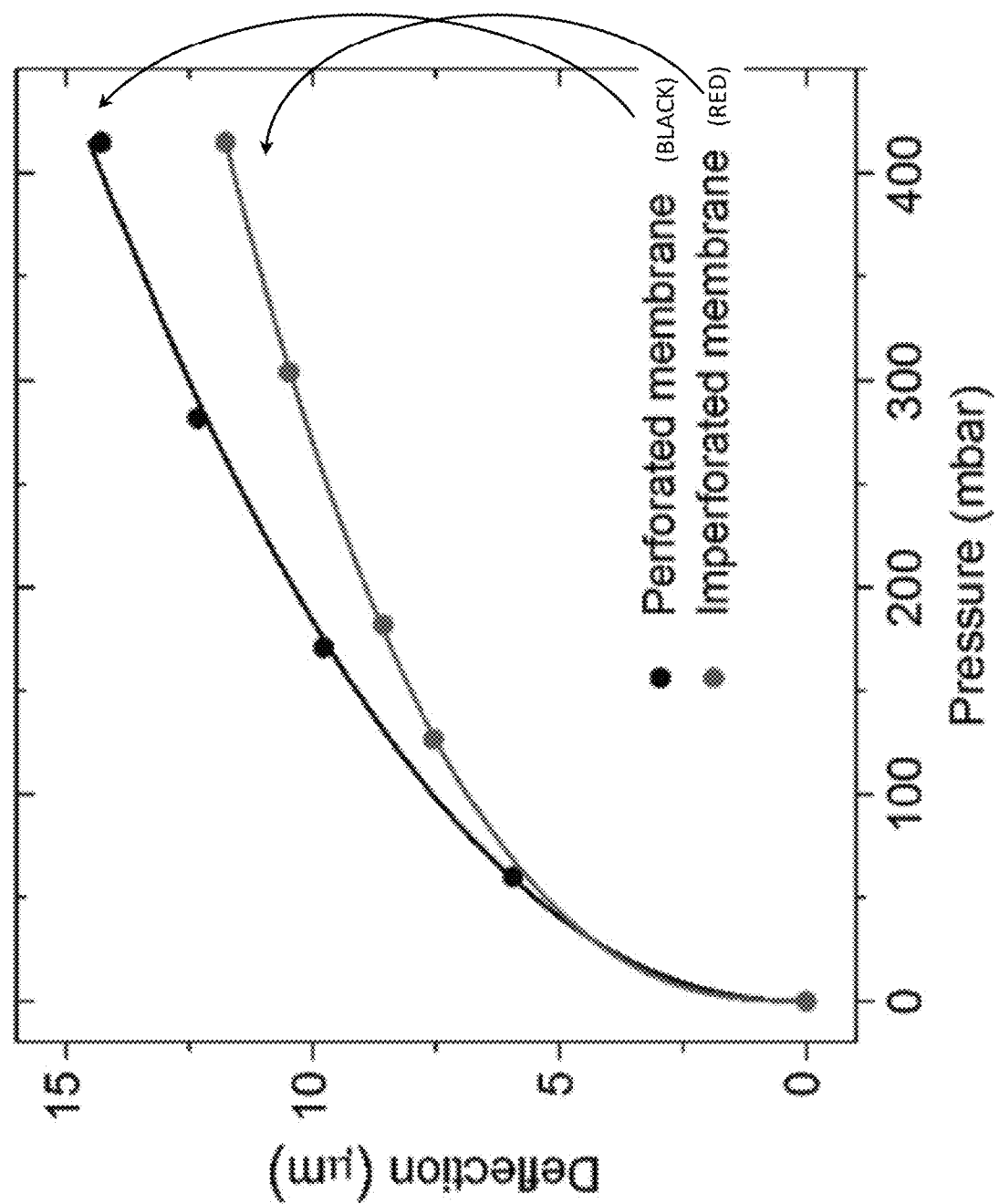

We studied the roles of the perforated SiN$_x$ membrane 14 and the graphene microdrums 16A-n over the through-holes 14A-n in determining the sensitivity of the sensor 10. First, the mechanical responses of the graphene coated perforated nitride membrane 14/16 to different applied pressures were visualized using a 3D optical surface profiler (ZYGO Newview, Middlefield, Conn.). As shown in FIG. 4(a), under 415 mbar differential pressure, the membrane 14/16 was deformed into a convex shape with a maximum out-of-plane deflection of 14.3 μm at its center. The measured surface profiles of the membrane 14/16 under other differential pressures were also given in FIG. 4(b). For a square imperforated nitride membrane, the maximum out-of-plane deflection δ with respect to differential pressure P can be described with the following equation:[39,40]

$$P = \frac{B_1 t \sigma_0}{(a/2)^2}\delta + \frac{B_2 f(v) t E}{(a/2)^4 (1-v)}\delta^3 \qquad (5)$$

where B1 and B2 are dimensionless constants, $\sigma_0$ is the initial stress, E is Young's modulus, a is the side length of the square membrane, $v$ is the Poisson ratio, f ($v$) is a geometry function, and t is the thickness of the membrane. B1=3.45, B2=1.994, $v$=0.22, and E=239 GPa were taken from ref 40 and 41. Previous research shows that the perforated membrane can be replaced with an imperforated one with a modified elastic modulus in the numerical calculation.[42] Thus, eqn (5) can also be applied to the perforated membrane. FIG. 4(c) shows the fitted results for the graphene coated perforated membrane, as well as the graphene coated imperforated counterpart membrane with the same dimensions for comparison purposes. It was found that $\sigma_0$=58 MPa and f ($v$)=0.32 for the perforated membrane, while $\sigma_0$=41 MPa and f ($v$)=0.65 for the imperforated one. By using the obtained deflection equations for both the perforated and imperforated membrane, the ratio of maximum deflection between the perforated and imperforated membrane can be expressed by eqn (6):

$$\frac{d_{perforated}}{d_{imperforated}} = 0.533 \times p^{0.08} \qquad (6)$$

Under a differential pressure of 415 mbar, the imperforated membrane with graphene had a maximum deflection of 11.7 μm, which was 2.6 μm lower than that of the perforated membrane with graphene. Eqn (6) also indicates that the further increasing differential pressure will not significantly improve the deflection of the graphene coated perforated membrane compared to the imperforated counterpart membrane, and therefore, will have some but limited effect on improving the pressure sensitivity of the device.

Next, we conducted mechanical simulations to illustrate the strain distributions in both the perforated and imperforated $SiN_x$ membranes, each including a ~2 nm thick graphene layer. The simulations were carried out through a finite element method based commercial package (COMSOL Multi-physics). Limited by computational power, a reduced model of side length 200 μm was calculated for the purpose of illuminating the working mechanism. According to eqn (5), assuming that there is zero initial stress in the $SiN_x$ membrane, the maximum out-of-plane deflection of the membrane will be proportional to $a^{4/3}/t^{1/3}$. Therefore, under the same differential pressure, the strain developed in the $SiN_x$ membrane with a real side length a=490 μm should be higher than that simulated with the reduced model of side length a=200 μm. While the strain of the membrane can be further increased by using a larger and thinner membrane, the increased strain will also lead to local cracks or even pop-out of the membrane under a low differential pressure, thus lowering the allowed maximum pressure of the sensor. Also, in our device fabrication, when the perforated thin $SiN_x$ membrane 14 had a side length of more than 750 μm, the membrane 14 was not able to initially stay flat but tended to bend downward, possibly due to the initial stress of the thin and relatively complex membrane 14 perforated by an array of through holes 14A-n. Therefore, we set the side length to 500 μm for the membrane 14, with which the maximum allowed pressure was around 600 mbar. Under a 500 mbar differential pressure, the imperforated membrane 14 had a maximum areal strain of 0.14% at the center of the membrane 14 with a deflection of 3.49 μm (FIG. 5(a)). For the perforated membrane 14, a similar strain distribution was observed. In the non-hole areas of the membrane 14 the maximum areal strain was found to be 0.15%, which was only slightly higher than that observed in the imperforated counterpart membrane. However, the maximum areal strain in the graphene layer 16A-n over the holes 14A-n reached 0.34% at the center of the membrane 14 with a maximum deflection of 4.13 μm. Therefore, the maximum strain in the hole areas 14A-n was as high as 2.27 times that occurring in the non-hole areas of the perforated membrane 14. Furthermore, the average areal strain along the line across the center of the perforated and imperforated membranes was 0.203% and 0.12%, respectively (FIG. 5(c)). Although the maximum deflection of the perforated and imperforated membranes differed only by 18.3% (3.49 μm vs. 4.13 μm), the average strain in the perforated membrane increases by 62.4% (0.203% vs. 0.12%) due to the introduction of the through-holes 14A-n into the $SiN_x$ membrane 14.

Figure 5C:
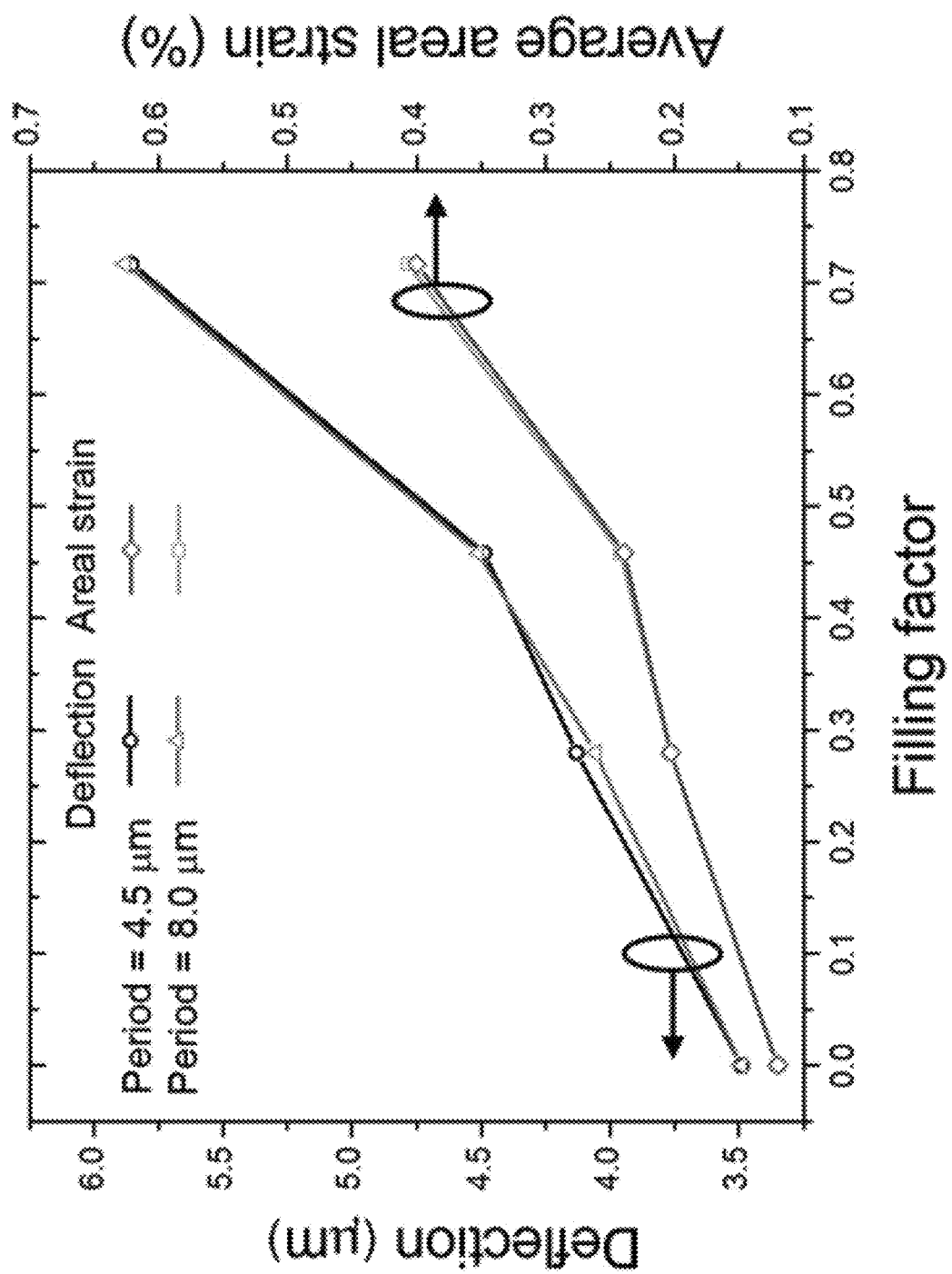

We further investigated the effect of the hole 14n diameter and period on the mechanical properties of the membrane 14. Here, the filling factor is defined as the ratio of the area of all the holes 14A-n to the area of the whole membrane 14. As shown in FIG. 5(c), given the same filling factor, the period of holes 14A-n has almost no influence on the deflection and average areal strain of the membrane 14. As the filling factor or the total hole area increases, the deflection and the average areal strain of the membrane continuously grows. For example, with an increasing filling factor from 0.28 (of the present device) to 0.46, the average areal strain only increases from 0.20% to 0.24%. A significant increase in the areal strain is observed from 0.24% to 0.40% as the filling factor increases from 0.46 to 0.72. To achieve a filling factor of 0.72 for the device with a period of 4.5 μm, the hole diameter should increase from the present 2.5 μm to 4 μm. However, two practical issues have played a role in restricting the hole size. First, the larger size holes may induce more pinholes in the graphene drums 16A-n when transferring the graphene 16 onto the membrane 14,[23] thus resulting in more air leakage. Second, with a filling factor of 0.72, the distance of two neighbouring holes 14n would be only 500 nm, which may lead to easy cracking or even pop-out of the membrane 14 under an applied differential pressure. Therefore, while the sensitivity of the device 10 can be improved further by introducing larger size holes 14A-n in the $SiN_x$ membrane 14, the present design with 2.5 μm-diameter through-holes is considered safe, conservative, and able to compromise between the sensitivity and robustness of the device 10.

Furthermore, as the differential pressure was applied to the graphene coated perforated membrane 14/16, the graphene micro-drums 16A-n over the holes 14A-n also bulged into a curved shape. To illustrate how this bulging factor affected the pressure sensitivity of the device 10 compared to the in-plane membrane strain, let us imagine a state when the strain in the pressurized $SiN_x$ membrane 14 is suppressed, i.e., the holes 14A-n stay in the plane and maintain the original circular shape with a diameter of 2.5 μm. Simulations showed that, under 500 mbar differential pressure, the graphene microdrum 16n will deflect by 9.1 nm at its center and an average strain of 0.0035% will be obtained over the whole microdrum. The magnitude of this strain is about two orders of magnitude lower than the aforementioned maximum strain of 0.34% in the microdrum. Therefore, the bulging of the pressurized circular graphene 16n had a limited influence on the overall strain change of the microdrum. As a matter of fact, the previously reported graphene-based pressure sensors employed the bulging effect of the graphene suspended over the wells in the fixed substrate, thus offering relatively low sensitivity.[32] From the comparison between the effects of the membrane strain and bulging, it is evident that the inhomogeneous membrane strain of the perforated membrane 14 was the key to the improved pressure sensitivity of the device 10.

Table 1 compares our device 10 with recently reported graphene-based MEMS/NEMS pressure sensors. Generally, the sensitivity of piezoresistive pressure sensors can be calculated using $$S = \frac{\Delta R}{R \times P}.$$

Our sensor 10 has a sensitivity of $2.18 \times 10^{-5}$ mbar$^{-1}$ which outperforms most of the reported graphene, polysilicon, and carbon nanotube based MEMS/NEMS pressure sensors.[7,31,32,38,43-46] Specifically, the present sensitivity is higher than the $2.96 \times 10^{-6}$ mbar$^{-1}$ of the standalone graphene membrane-based sensor[7] and the $6.67 \times 10^{-6}$ mbar$^{-1}$ of the sensor using the graphene meander patterns on the imperforated SiN$_x$ membrane.[31] As mentioned above, another previous pressure sensor used a graphene membrane suspended over the wells made in a SiO$_2$ layer on the bulk silicon substrate, where the resistance variation only came from the bulging effect of the graphene. The resulting sensitivity of that sensor was about 32 times lower compared to our sensor 10.

suspended (at 12A and 12B) nitride membrane 14 (490×490 µm$^2$)(FIG. 6(*d*)). The wafer was then diced into 6×6 mm$^2$ pieces for the following processes. A commercially available CVD-grown graphene film 16 on a 25 µm thick nickel foil (1×1 cm$^2$, University Wafer, Boston, Mass.) was used as the sensitive material of the device. Only one side of the foil was coated with graphene. To transfer the graphene film 16 to the suspended nitride membrane 14, we used the poly(methyl methacrylate) or PMMA based transfer method following the protocol given in ref 18. In this step, the nickel foil with graphene was drop-coated with PMMA (molecular weight ~996 000 by GPC, Sigma-Aldrich, dissolved in chlorobenzene with a concentration of 46 mg mL$^{-1}$)(FIG. 6(*e*)). The foil was then cured at 180° C. for 1 min, followed by etching away the nickel substrate by FeCl$_3$ solution (0.1 g ml$^{-1}$, Sigma-Aldrich, St Louis, Mo.) for 20 h (FIG. 6(*f*)). After that, the PMMA-graphene stack 16 was picked up and washed with deionized water, and then, was placed on the SiN$_x$ membrane 14 treated with oxygen plasma (FIG. 6(*g*)). Finally, the PMMA substrate of the graphene film was etched by PMMA remover (Nano remover PG, MicroChem, Westborough, Mass.) (FIG. 6(*i*)). Next, the graphene resistor 16 was patterned in an oxygen plasma etcher with the help of a shadow mask made of aluminum prefabricated by a high-precision milling machine (Supra CNC Mill, CNC Masters, Irwindale, Calif.) (FIG. 6(*j*)). Then, another aluminum shadow mask was machined and placed on the device to make gold contacts 12 by e-beam evaporation of a 200 nm gold layer (FIG. 6(*k*)). In these shadow mask based pattern-

TABLE 1

Performance comparison among MEMS pressure sensors

| Device structure | Dimensions (µm$^2$) | Sensitivity (mbar$^{-1}$) | Ref. (each incorporated by reference herein) |
|---|---|---|---|
| Graphene 16 on suspended perforated SiN$_x$ membrane 14 (device 10) | 490 × 490 | 2.8 × 10$^{-5}$ | This work |
| Suspended graphene | 6 × 64 | 2.96 × 10$^{-6}$ | Smith, et al., Nano Lett., 2013 [7] |
| Graphene on suspended imperforated SiN$_x$ membrane | 280 × 280 | 6.67 × 10$^{-6}$ | Zhu, et al., Appl. Phys. Lett., 2013 [31] |
| Graphene on fixed perforated layer on silicon substrate | 110 × 220 | 0.88 × 10$^{-6}$ | Hurst, et al., Transducers, 2013 [32] |
| Carbon nanotubes | 100 × 100 | 1.06 × 10$^{-6}$ | Hierold, et al., Sens. Actuators, A, 2007 [44] |
| Polysilicon on suspended polysilicon diaphragm | 100 × 100 | 1.5 × 10$^{-6}$ | Kalvesten, et al., MEMS, 1998 [43] |
| Polysilicon on suspended silicon oxide diaphragm | 400 × 400 | 1.29 × 10$^{-6}$ | Yang, et al., Tamkang J., Sci. Eng., 2005 [45] |
| Boron doped silicon in crystalline silicon diaphragm | 470 × 470 | 3.2 × 10$^{-6}$ | Zhang et al., IEEE Sens. J., 2007 [46] |

3. Methods 3.1 Device Fabrication

The device fabrication started with a 3-in double side polished silicon wafer (p-type). A 200 nm thick SiN$_x$ layer was formed on both sides of the wafer by plasmon enhanced chemical vapor deposition (FIG. 6(*a*)). Etch windows were then created on the back side of the wafer with photolithography and reactive ion etching of SiN$_x$ (FIG. 6(*b*)). Subsequently, an array of 2.5 µm diameter holes 14A-n were patterned in the SiN$_x$ layer 14 on the front side of the wafer with the same method as that used in the last step (FIG. 6(*c*)). After that, an anisotropic etch of silicon substrate 12 with tetramethylammonium hydroxide (20.0 wt %, 78° C., Sigma-Aldrich, St Louis, Mo.) was performed to create a ings, careful alignment between the shadow mask and the device was needed. Finally, the device 10 was realized (FIG. 6(*l*)).

3.2 Measurement Setup

The backside of the device 10 was adhered to the outlet of an acrylic glass based microfluidic channel (not shown) with structural adhesives. Air pressure was applied from the inlet of the air channel using a programmable syringe pump (KDS210P, KD Scientific, Holliston, Mass.). A commercial differential pressure sensor (MPX5500DP, Freescale Semiconductor, Austin, Tex.) was used to measure differential pressures applied across the sensing membrane 14/16. A feedback circuit was used to enhance stability of the pressure control system. The output voltage signal of the commercial sensor was recorded by a data acquisition device (DI-245, DATAQ Instruments, Akron, Ohio) and then was converted to a differential pressure. The graphene sensor 10/12/14/16/18 was connected into a Wheatstone bridge circuit as shown in FIG. 2(*a*). An input DC voltage of 20 mV was applied across the bridge circuit. The small voltage was applied to avoid excessive heating of graphene. The output voltage from the graphene sensor 10 was recorded with a digital multimeter (34401A, Agilent Technologies, Santa Clara, Calif.).

4. Conclusion

In conclusion, we have demonstrated a graphene based small area MEMS pressure sensor formed by transferring large area CVD-grown graphene onto a suspended $SiN_x$ membrane perforated by an array of through-holes. The large voltage response of the sensor was majorly due to the large strain change of the graphene suspended over the through-holes under an applied differential pressure across the membrane. The measured sensitivity has demonstrated that the devised new pressure sensor structure excels in providing high sensitivity that outperforms many other existing graphene based counterpart sensors. Future work includes optimizing fabrication processes to reduce the number of pinholes in graphene, improving the yield of transferring graphene membrane to suspended nitride membrane, and designing a low-noise electronic readout circuit for the sensor.

NOTES AND REFERENCES (WHICH ARE EACH INCORPORATED BY REFERENCE HEREIN)

1 K. I. Bolotin, K. J. Sikes, Z. Jiang, M. Klima, G. Fudenberg, J. Hone, P. Kim and H. L. Stormer, Solid State Commun., 2008, 146, 351-355.
2 S. V. Morozov, K. S. Novoselov, M. I. Katsnelson, F. Schedin, D. C. Elias, J. A. Jaszczak and A. K. Geim, Phys. Rev. Lett., 2008, 100, 016602.
3 I. W. Frank, D. M. Tanenbaum, A. M. Van der Zande and P. L. McEuen, J. Vac. Sci. Technol., B, 2007, 25, 2558-2561.
4 C. Lee, X. D. Wei, J. W. Kysar and J. Hone, Science, 2008, 321, 385-388.
5 M. Poot and H. S. J. van der Zant, Appl. Phys. Lett., 2008, 92, 063111.
6 J. S. Bunch, S. S. Verbridge, J. S. Alden, A. M. van der Zande, J. M. Parpia, H. G. Craighead and P. L. McEuen, Nano Lett., 2008, 8, 2458-2462.
7 A. D. Smith, F. Niklaus, A. Paussa, S. Vaziri, A. C. Fischer, M. Sterner, F. Forsberg, A. Delin, D. Esseni, P. Palestri, M. Ostling and M. C. Lemme, Nano Lett., 2013, 13, 3237-3242.
8 S. P. Koenig, N. G. Boddeti, M. L. Dunn and J. S. Bunch, Nat. Nanotechnol., 2011, 6, 543-546.
9 D. E. Jiang, V. R. Cooper and S. Dai, Nano Lett., 2009, 9, 4019-4024.
10 F. Guo, G. Silverberg, S. Bowers, S. P. Kim, D. Dana, V. Shenoy and R. H. Hurt, Environ. Sci. Technol., 2012, 46, 7717-7724.
11 N. N. Klimov, S. Jung, S. Z. Zhu, T. Li, C. A. Wright, S. D. Solares, D. B. Newell, N. B. Zhitenev and J. A. Stroscio, Science, 2012, 336, 1557-1561.
12 Q. K. Yu, J. Lian, S. Siriponglert, H. Li, Y. P. Chen and S. S. Pei, Appl. Phys. Lett., 2008, 93, 113103.
13 X. S. Li, W. W. Cai, J. H. An, S. Kim, J. Nah, D. X. Yang, R. Piner, A. Velamakanni, I. Jung, E. Tutuc, S. K. Banerjee, L. Colombo and R. S. Ruoff, Science, 2009, 324, 1312-1314.
14 A. Reina, X. T. Jia, J. Ho, D. Nezich, H. B. Son, V. Bulovic, M. S. Dresselhaus and J. Kong, Nano Lett., 2009, 9, 30-35.
15 L. Y. Jiao, B. Fan, X. J. Xian, Z. Y. Wu, J. Zhang and Z. F. Liu, J. Am. Chem. Soc., 2008, 130, 12612-12613.
16 A. Reina, H. B. Son, L. Y. Jiao, B. Fan, M. S. Dresselhaus, Z. F. Liu and J. Kong, J. Phys. Chem. C, 2008, 112, 17741-17744.
17 K. S. Kim, Y. Zhao, H. Jang, S. Y. Lee, J. M. Kim, K. S. Kim, J. H. Ahn, P. Kim, J. Y. Choi and B. H. Hong, Nature, 2009, 457, 706-710.
18 X. S. Li, Y. W. Zhu, W. W. Cai, M. Borysiak, B. Y. Han, D. Chen, R. D. Piner, L. Colombo and R. S. Ruoff, Nano Lett., 2009, 9, 4359-4363.
19 C. R. Dean, A. F. Young, I. Meric, C. Lee, L. Wang, S. Sorgenfrei, K. Watanabe, T. Taniguchi, P. Kim, K. L. Shepard and J. Hone, Nat. Nanotechnol., 2010, 5, 722-726.
20 B. Aleman, W. Regan, S. Aloni, V. Altoe, N. Alem, C. Girit, B. S. Geng, L. Maserati, M. Crommie, F. Wang and A. Zettl, ACS Nano, 2010, 4, 4762-4768.
21 W. Regan, N. Alem, B. Aleman, B. S. Geng, C. Girit, L. Maserati, F. Wang, M. Crommie and A. Zettl, Appl. Phys. Lett., 2010, 96, 113102.
22 K. Kim, Z. Lee, W. Regan, C. Kisielowski, M. F. Crommie and A. Zettl, ACS Nano, 2011, 5, 2142-2146.
23 J. W. Suk, A. Kitt, C. W. Magnuson, Y. F. Hao, S. Ahmed, J. H. An, A. K. Swan, B. B. Goldberg and R. S. Ruoff, ACS Nano, 2011, 5, 6916-6924.
24 Z. H. Ni, T. Yu, Y. H. Lu, Y. Y. Wang, Y. P. Feng and Z. X. Shen, ACS Nano, 2008, 2, 2301-2305.
25 V. M. Pereira, A. H. Castro Neto and N. M. R. Peres, Phys. Rev. B: Condens. Matter, 2009, 80, 045401.
26 Y. Lee, S. Bae, H. Jang, S. Jang, S. E. Zhu, S. H. Sim, Y. I. Song, B. H. Hong and J. H. Ahn, Nano Lett., 2010, 10, 490-493.
27 X. W. Fu, Z. M. Liao, J. X. Zhou, Y. B. Zhou, H. C. Wu, R. Zhang, G. Y. Jing, J. Xu, X. S. Wu, W. L. Guo and D. P. Yu, Appl. Phys. Lett., 2011, 99, 213107.
28 Y. Wang, R. Yang, Z. W. Shi, L. C. Zhang, D. X. Shi, E. Wang and G. Y. Zhang, ACS Nano, 2011, 5, 3645-3650.
29 M. Y. Huang, T. A. Pascal, H. Kim, W. A. Goddard and J. R. Greer, Nano Lett., 2011, 11, 1241-1246.
30 H. Hosseinzadegan, C. Todd, A. Lal, M. Pandey, M. Levendorf and J. Park, IEEE 25th International Conference on Micro Electro Mechanical Systems (Mems), Paris, 2012, pp. 611-614.
31 S. E. Zhu, M. K. Ghatkesar, C. Zhang and G. C. A. M. Janssen, Appl. Phys. Lett., 2013, 102, 161904.
32 A. M. Hurst, S. Lee, N. Petrone, J. VanDeWeert, A. M. van der Zande and J. Hone, Solid-State Sensors, Actuators and Microsystems (TRANSDUCERS & EUROSENSORS XXVII), 2013 Transducers & Eurosensors XXVII: The 17th International Conference, Barcelona, 2013, pp. 586-589.
33 H. B. Yao, J. Ge, C. F. Wang, X. Wang, W. Hu, Z. J. Zheng, Y. Ni and S. H. Yu, Adv. Mater., 2013, 25, 6692-6698.
34 H. Tian, Y. Shu, X. F. Wang, M. A. Mohammad, Z. Bie, Q. Y. Xie, C. Li, W. T. Mi, Y. Yang and T. L. Ren, Sci. Rep., 2015, 5, 8603.

35 C. W. Chen, F. Ren, G. C. Chi, S. C. Hung, Y. P. Huang, J. Kim, I. I. Kravchenko and S. J. Pearton, J. Vac. Sci. Technol., B, 2012, 30, 060604.

36 W. Li, Y. R. Liang, D. M. Yu, L. M. Peng, K. P. Pernstich, T. Shen, A. R. H. Walker, G. J. Cheng, C. A. Hacker, C. A. Richter, Q. L. Li, D. J. Gundlach and X. L. Liang, Appl. Phys. Lett., 2013, 102, 183110.

37 J. Seo, W. S. Chang and T. S. Kim, Thin Solid Films, 2015, 584, 170-175.

38 A. D. Smith, S. Vaziri, A. Delin, M. Ostling and M. C. Lemme, Ultimate Integration on Silicon (ULIS), 2012 13th International Conference, Grenoble, 2012, pp. 21-24.

C. Alternatives and Options

As mentioned previously, the invention can take different forms and embodiments. Some examples are set forth above. Some additional examples follow.

1. Perforated Flexible Layer.

As indicated, in the exemplary embodiments, the flexible membrane 14 is made of $SiN_x$ material. FIG. 7 is a highly diagrammatic illustration of one form factor for the flexible membrane with plural graphene layers 16 exploded above it. Dimensions are indicated for this one non-limiting example. While $SiN_x$ is mentioned in the specific embodiments, it is to be understood that the flexible membrane or layer can take other forms and embodiments. The material of membrane 14 is therefore not limited to $SiN_x$. A few non-limiting examples are listed below. Others are possible that exhibit at least analogous characteristics $SiN_x$, including but not limited to (1) allowing graphene or other piezoresistive membrane/layer to cover and stay in place, (2) have an inhomogeneous membrane strain under fluid pressure, (3) allow formation of functionally acceptable micro-scale through-holes, and (4) have a reasonable life expectancy. Examples (non-limiting) of other possible materials are:

a. $SiO_2$,
b. $SiO_xN_y$.
c. poly-silicon,
d. silicon,
e. SiC,
f. polymer,
g. elastomer,
h. combinations of the above.

The properties of silicon nitride are well-known in the art. See, e.g., Zhu et al. Applied Physics Letters 102, 161904 (2013), incorporated by reference above. $SiN_x$ exhibits the following types of properties:

i. Low porosity;
ii. High flexural strength;
iii. High strength over a wide temperature range.
iv. High-fracture toughness.
v. High hardness.
vi. Outstanding wear resistance, both impingement and frictional modes.
vii. Good thermal shock resistance.
viii. is insoluble in water.
ix. Electrically insulative.

Yet it is sufficiently flexible when in thin film form factor that it can flex or deform from its suspension points over the range of differential pressures indicated. Alternative potential materials that have analogous material properties are candidates for the flexible perforated substrate. As noted above, flexible perforated membrane 14 can be monolithic. But it also could be composite in the sense of multiple layers. The designer would have to make sure that such layers stay together over the range of flexing and strain required for a given application. This may be possible simply by abutting the layers and relying on such things as van der Waals forces. It may require adhesives. The goal would be that any composite flexible perforated layer essentially work as a single integrated layer for the intended purposes discussed herein and allow and maintain alignment of nano or micro-sized perforations through all layers.

2. Perforations

As indicated, in the exemplary embodiments, the perforations or through-holes 14A-n in the flexible membrane 14 can vary in diameter and filling factor. Specific examples are given. Variations are possible such that they exhibit at least analogous characteristics, including but not limited to (1) allow the inhomogeneous deformation in response to pressure, (2) provide a highly sensitive correlation to pressure, (3) allow formation of micro-drums over the through-holes, and (4) have a reasonable life expectancy. The shape of hole could be circular, square, triangular, etc. Examples (non-limiting) of perforation shape are:

a. circular:
b. square;
c. triangular.

As discussed above in the specific examples, there can be competing factors in designing the filling factor of the perforations. The designer would keep those in mind depending on need or desire of the specific application. It is to be understood that while the specific embodiments tend to emphasize a periodic array of circular perforations or through-holes, the invention is not limited thereto. For example, it is possible for a non-uniform or non-periodic set of through-holes. They do not have to be symmetrical in shape. They could be slots including straight slots, curve slots, or other form factors. Through-holes are perforations and also do not have to be the same. It is envisioned the invention would work to some beneficial degree with any of these or other variations that take advantage of the micro-drum effect as illustrated in the specific examples discussed earlier. The perforations may not necessarily even be uniform or even similar in size, orientation if circular, of any specific density or filling factor so long as effective to produce the "drum effect", even if not optimal. Through empirical testing, these factors regarding the perforations can be developed and/or optimized according to the designer's need or desire.

3. Piezo-Effect Layer

As indicated, in the exemplary embodiments, the graphene 16 is a few layers of one atom average thickness graphene. In one example the number is six, having an approximate thickness of 2 nm. FIG. 7 is a highly diagrammatic illustration of one form factor for such graphene layers shown exploded above the flexible membrane. Dimensions are indicated for this one non-limiting example. The number of layers can vary (in FIG. 7 indicated as layer 1, layer 2, . . . , layer n). The number of layers can vary such that they exhibit at least analogous characteristics, including but not limited to (1) stay intact and in place on the flexible membrane, (2) provide a substantially linear piezoresistive response to pressure, (3) allow formation of micro-drums over the through-holes on the flexible membrane such that they bulge in response to pressure, and (4) have a reasonable life expectancy. Examples (non-limiting) are:

a. Graphene 16 could be placed at the back of the perforated membrane 14;
b. Graphene 16 could be laminated/sandwiched between perforated membranes 14.

As indicated above, the graphene could be a sheet or multilayer sheet across the perforated membrane or could be patterned. One example of a pattern is a meandering resistor form. Others are given in some of the incorporated by reference citations. The designer can use conventional MEMS fabrication techniques for a variety of patterns consistent with measuring piezoresistive effect from strain.

It is to be understood that graphene is a good candidate for the piezo-effect membrane layer of the membrane composite or assembly because of the aforementioned functional attributes it inherently has. But, importantly, the invention is not limited to it or its variations and derivatives. As mentioned above, a few additional non-limiting examples have been stated. The designer, even if not optimal, can select any of a wide variety of materials that exhibit piezoresistive, piezoelectric, or similar effect under variation of strain, can be both created and applied to a respective flexible perforated supporting membrane or layer as discussed above while retaining sufficient piezo-effect under strain for the form factors and scales desired. For example, materials other than graphene or graphene based that can act with the flexible perforated layer and produce the drum effect described herein. The designer would likely through empirical testing affirm the same including that the piezo-effect or analogous layer retained sufficient functionality over the range of operating conditions needed or desired for a given application. As will be appreciated by those skilled in this technical area, piezoresistive effect is one example of piezo-effect, which can take other forms, including piezoelectric effect. Most piezo devices are piezoresistive or piezoelectric where, under pressure, vibration, or other forms of stress, it generates a charge or voltage that can be sensed or transduced. The invention can use such piezo-effect in most if not all its forms.

4. Membrane Assembly

As indicated above, what is sometimes called the membrane assembly refers to the selected combination or composite of the flexible perforated membrane and piezo-effect membrane. It is to be understood that by assembly it is simply meant that they be combined typically in abutment at facing surfaces and function together in the form discussed herein to achieve sufficient functionalities as described herein. Again, it might simply be a matter of relying on forces such as van der Waals or similar forces such that the layers have sufficient adherence to one another over the range of operating conditions needed for an application. By MEMs techniques or otherwise, there may be a specific adhesive between those layers. It would be important that such adhesive not occlude or otherwise disrupt the drum effect.

5. Suspension Base

As indicated, in the exemplary embodiments, the flexible member 14 is suspended on a base 12 of Si. The Si is micromachined to form the void or measuring space 20 under the flexible membrane 14. The material 12 can vary such that it exhibits at least analogous characteristics, including but not limited to (1) stay intact and support the flexible membrane, (2) provide a substantially solid suspension base, (3) allow formation of voids under the flexible membrane, and (4) have a reasonable life expectancy. Examples (non-limiting) are:
  a. ceramic;
  b. plastic.
  c. metal
  d. glass
  e. quartz As will be appreciated, one of the reasons for Si is its well-known characteristics that can be implemented in MEMS fabrication. It also has good durability, hardness, robustness to serve as suspension/anchor points form the flexible membrane, including over its anticipated normal useful life as such a flexing transducer of differential pressure. Further details about suspending a flexible membrane can be seen in some of the cited references, including Zhu et al. Applied Physics Letters 102, 161904 (2013), incorporated by reference above. It is to be understood that the above examples are non-limiting. Again, so long as the material commits form factor, and characteristics provide the needed functions for a given application it is a candidate. This could include, for example, combinations of any of the above, if possible, or other candidate materials.

6. Fabrication Techniques

As indicated, in the exemplary embodiments, the sensor is fabricated by certain MEMS techniques. Alternatives are possible such that they produce at least analogous results.

7. System

Those skilled in the art will appreciate and know structures and techniques for finalizing the fabricated sensor(s) of the example above into a sensor assembly. For example, microfluidic-type techniques can be implemented in MEMS fabrication or otherwise to produce a flow path (gas or fluid phase) to the sensing space at the suspended flexible perforated membrane to respond to applied pressure or force of interest. The addition of electrodes 18 to sense electrical reaction to strain at the graphene can take different forms and embodiments. The communication of the sensed piezo-effect changes for further use can vary according to need or desire. This can include but is not limited to local read-out circuitry and/or transmission (wired or wirelessly or a combination of both) to other electrical/electronic/processing components either local or remote. Some of the incorporated by reference citations give some specific examples that could be used with the principles of the present invention.

As will be appreciated by those skilled in the art, the specific embodiments of the invention focus on sensing a force related to the applied force of a gas-phase fluid against the flexible membrane/graphene assembly, but the assembly can be used to sense gas-phase pressure, fluid-phase pressure, mechanical pressure, or a combination of any of the foregoing so long as the applied force generates a piezo-effect in the graphene from strain in the graphene or in other piezo material. The ways in which any of such applied forces are presented to the membrane assembly can vary according to need or desire.

The invention claimed is:

1. A method of high sensitivity pressure sensing comprising:
  a. creating a membrane assembly comprising a flexible layer with opposite sides and a perforated area having a plurality of perforations comprising an array of through-holes between the opposite sides of the flexible layer, and a piezo-effect layer covering the plurality of perforations of the perforated area on one of the opposite sides of the flexible layer;
  b. suspending the covered perforated area of the membrane assembly over a void at suspension points at or beyond opposite sides of the perforated area of the flexible layer;
  c. exposing the covered perforated area of the membrane assembly to an applied force;
  d. measuring a piezo-effect response in the piezo-effect layer of the membrane assembly to the applied force; and
  e. correlating the measured piezo-effect response to a pressure value.

2. The method of claim 1 wherein the perforated flexible layer comprises a material that can flex or deform from the suspension points over the void.

3. The method of claim 2 wherein the perforated flexible layer comprises at least one of:
   a. $SiO_2$;
   b. $SiO_xN_y$;
   c. poly-silicon;
   d. silicon;
   e. SiC;
   f. polymer; and
   g. elastomer.

4. The method of claim 1 wherein the perforated flexible layer is a few tens of nanometers to a few thousands of nanometers in thickness.

5. The method of claim 1 wherein the perforated flexible layer comprises $SiN_x$ having a form factor of on the order of:
   a. a few hundreds to a few thousands of µm in length and width;
   b. a few tens to a few hundreds nanometers in thickness.

6. The method of claim 1 wherein the array of through-holes is periodic and the through-holes comprise:
   a. on the order of sub-micron to micron range diameters; and
   b. on the order of sub-micron to micron range spacing.

7. The method of claim 1 wherein the piezo-effect layer comprises:
   a. graphene; or
   b. graphene based material.

8. The method of claim 1 wherein the piezo-effect layer comprises:
   a. graphene;
   b. silicon;
   c. polysilicon;
   d. molybdenum disulfide; or
   e. material exhibiting a piezo-effect including piezoresistive or piezoelectric effect.

9. The method of claim 7 wherein the graphene comprises plural layers.

10. The method of claim 9 wherein the plural layers comprise:
    a. approximately 6 layers; and
    b. a total thickness of on the order of 2 nm.

11. The method of claim 1 wherein the piezo-effect layer forms microdrums at each of the plurality of perforations.

12. The method of claim 1 wherein the piezo-effect layer is patterned as a resistor.

13. The method of claim 12 wherein the resistor pattern relates to at least one of:
    a. resistance, charge, or voltage of the piezo-effect layer suspended over the void;
    b. resistance, charge, or voltage of the piezo-effect layer in surrounding regions; and
    c. contact resistance between electrical contacts and the piezo-effect layer.

14. The method of claim 1 wherein the applied force comprises:
    a. gaseous phase pressure;
    b. liquid phase pressure;
    c. mechanical pressure; or
    d. a combination of any of a-c.

15. A highly sensitive MEMS pressure sensor made according to the steps of:
    a. providing a substrate having a thickness between first and second opposite sides;
    b. forming a flexible layer on both of the first and second opposite sides of the substrate;
    c. patterning an array of through-holes in an area of the layer;
    d. removing portions of the substrate and the layer on the second opposite side of the substrate aligned with the array of through-holes on the patterned layer on the first opposite side of the substrate to leave the array of through-holes suspended over a void;
    e. adding one or more graphene layers covering the whole array of the through-holes of the patterned layer; and
    f. connecting a set of electrodes to the one or more graphene layers;
    g. so that differential pressure relative to the flexible layer and the one or more graphene layers can be derived from electrical measurements from the set of electrodes.

* * * * *